(12) United States Patent
Papasakellariou et al.

(10) Patent No.: US 10,728,858 B2
(45) Date of Patent: Jul. 28, 2020

(54) UPLINK TRANSMISSION FOR DUAL CONNECTIVITY

(71) Applicant: Samsung Electronics Co., Ltd., Suwon-si, Gyeonggi-do (KR)

(72) Inventors: Aris Papasakellariou, Houston, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/223,037

(22) Filed: Dec. 17, 2018

(65) Prior Publication Data

US 2019/0124599 A1    Apr. 25, 2019

Related U.S. Application Data

(63) Continuation of application No. 15/897,070, filed on Feb. 14, 2018, now Pat. No. 10,536,905, which is a
(Continued)

(51) Int. Cl.
*H04W 52/14* (2009.01)
*H04W 52/36* (2009.01)
(Continued)

(52) U.S. Cl.
CPC ....... *H04W 52/146* (2013.01); *H04W 52/367* (2013.01); *H04L 5/1469* (2013.01);
(Continued)

(58) Field of Classification Search
CPC  H04W 52/146; H04W 52/386; H04W 52/367
See application file for complete search history.

(56) References Cited

U.S. PATENT DOCUMENTS

| 2007/0173208 A1 | 7/2007 | Nishio et al. |
| 2012/0008577 A1 | 1/2012 | Han et al. |

(Continued)

FOREIGN PATENT DOCUMENTS

| CN | 1926785 A | 3/2007 |
| CN | 102318220 A | 1/2012 |
| WO | 2013081654 A2 | 6/2013 |

OTHER PUBLICATIONS

China National Intellectual Property Administration, "The First Office Action," Application No. CN201580004521.7, dated Dec. 4, 2018, 17 pages.
(Continued)

*Primary Examiner* — Hoon J Chung

(57) ABSTRACT

Methods and apparatus are provided for a User Equipment (UE) configured by a Master enhanced NodeB (MeNB) for operation with dual connectivity to a Secondary eNB (SeNB) to determine a power for transmission to the MeNB and a power for transmission to the SeNB in a subframe when a total power the UE determines according to power control processes for transmission to the MeNB and for transmission to the SeNB exceeds a maximum transmission power in the subframe. Methods and apparatus are also provided for the MeNB to select one or more antenna ports the UE uses to transmit to the MeNB and inform the selected antenna ports to the UE.

20 Claims, 10 Drawing Sheets

Related U.S. Application Data continuation of application No. 14/591,756, filed on Jan. 7, 2015, now Pat. No. 9,900,844.

(60) Provisional application No. 61/926,822, filed on Jan. 13, 2014.

(51) Int. Cl.
  *H04W 52/34* (2009.01)
  *H04W 88/08* (2009.01)
  *H04L 5/14* (2006.01)
  *H04W 52/28* (2009.01)

(52) U.S. Cl.
  CPC .......... *H04W 52/281* (2013.01); *H04W 52/34* (2013.01); *H04W 88/08* (2013.01)

(56) References Cited

U.S. PATENT DOCUMENTS

| | | |
|---|---|---|
| 2012/0083308 A1 | 4/2012 | Wang et al. |
| 2013/0121264 A1 | 5/2013 | Heo et al. |
| 2013/0153298 A1 | 6/2013 | Pietraski et al. |
| 2013/0258884 A1 | 10/2013 | Xu et al. |
| 2015/0341864 A1* | 11/2015 | Yang .................. H04W 52/281 455/522 |
| 2016/0100420 A1 | 4/2016 | Chen et al. |
| 2016/0174160 A1* | 6/2016 | Shen .................. H04W 52/146 455/522 |
| 2016/0249362 A1* | 8/2016 | Uchino ............... H04W 52/386 |

OTHER PUBLICATIONS

IP Australia, Examination Report No. 1 regarding Application No. 2018278947, dated Feb. 21, 2020, 5 pages.
Intellectual Property India, Examination Report regarding Application No. 201637026319, dated Mar. 23, 2020, 6 pages.
USPTO Office Action regarding U.S. Appl. No. 16/223,052, dated Apr. 2, 2020, 23 pages.

* cited by examiner

UPLINK TRANSMISSION FOR DUAL CONNECTIVITY

CROSS-REFERENCE TO RELATED APPLICATION AND CLAIM OF PRIORITY

The present application is a continuation of U.S. patent application Ser. No. 15/897,070, filed Feb. 14, 2018, which is a continuation of U.S. patent application Ser. No. 14/591,756, filed Jan. 7, 2015, now U.S. Pat. No. 9,990,844, which claims the benefit of U.S. Provisional Patent Application No. 61/926,822 filed Jan. 13, 2014. The contents of the above-identified patent documents are incorporated herein by reference.

TECHNICAL FIELD

The present application relates generally to wireless communications and, more specifically, to uplink transmissions in dual connectivity operation.

BACKGROUND

Wireless communication has been one of the most successful innovations in modem history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

Embodiments of the present disclosure provide methods and an apparatus to support transmissions from a User Equipment (UE) in dual connectivity operation.

In a first embodiment, a method includes determining, by a first base station, a first percentage of a maximum UE transmission power for transmissions from a UE to the first base station and a second percentage of the maximum UE transmission power for transmissions from the UE to a second base station. The method additionally includes signaling, by the first base station to the UE, the first percentage of the maximum UE transmission power and the second percentage of the maximum UE transmission power.

In a second embodiment, a base station includes a controller and a transmitter. The controller is configured to determine a first subset of transmitter antennas from a set of transmitter antennas of a UE. The transmitter configured to transmit, to the UE, a configuration for the UE to communicate with the base station and with a second base station, and an indication for the UE to use the first subset of transmitter antennas for transmitting to the base station.

In a third embodiment, a User Equipment (UE) includes a receiver and a transmitter. The receiver is configured to receive a configuration to communicate with a first base station and with a second base station and an indication to use a first subset of transmitter antennas, from a set of transmitter antennas, for transmitting to the first base station. The transmitter is configured to transmit to the first base station using the first subset of transmitter antennas and to the second base station using transmitter antennas from the set of transmitter antennas that are not in the first subset of transmitter antennas.

In a fourth embodiment, a base station includes a controller and a transmitter. The controller is configured to determine a first percentage of a maximum UE transmission power for transmissions from a UE to the base station and a second percentage of the maximum UE transmission power for transmissions from the UE to a second base station. The transmitter is configured to transmit, to the UE, the first percentage of the maximum UE transmission power and the second percentage of the maximum UE transmission power.

In a fifth embodiment, a User Equipment (UE) includes a receiver and a transmitter. The receiver configured to receive a configuration for communication with a first base station and with a second base station, and a first percentage of a maximum UE transmission power for transmissions from the UE to the first base station and a second percentage of the maximum UE transmission power for transmissions from the UE to a second base station. The transmitter is configured to transmit to the first base station and to the second base station. If in a transmission time interval of one subframe (SF) the UE either reduces a transmission power to the first base station or reduces a transmission power to the second base station, the UE does not reduce the transmission power to the first base station below the first percentage of the maximum UE transmission power in the SF or the UE does not reduce the transmission power to the second base station below the second percentage of the maximum UE transmission power in the SF, respectively.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the invention. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TS 36.321 v11.2.0, "E-UTRA, Medium Access Control (MAC) protocol specification" (REF 4); 3GPP TS 36.331 v11.2.0, "E-UTRA, Radio Resource Control (RRC) Protocol Specification" (REF 5); 3GPP TS 36.101 v11.2.0, "Evolved Universal Terrestrial Radio Access (E-UTRA); User Equipment (UE) radio transmission and reception" (REF 6), and US Patent Publication 2014/0192738, filed on Jan. 8, 2014 and entitled "UPLINK CONTROL INFORMATION TRANSMISSIONS/RECEPTIONS IN WIRELESS NETWORKS" (REF 7).

One or more embodiments of the present disclosure relate to uplink transmissions in dual connectivity operation. A wireless communication network includes a DownLink (DL) that conveys signals from transmission points, such as base stations or enhanced NodeBs (eNBs), to UEs. The wireless communication network also includes an UpLink (UL) that conveys signals from UEs to reception points, such as eNBs.

Figure 1:
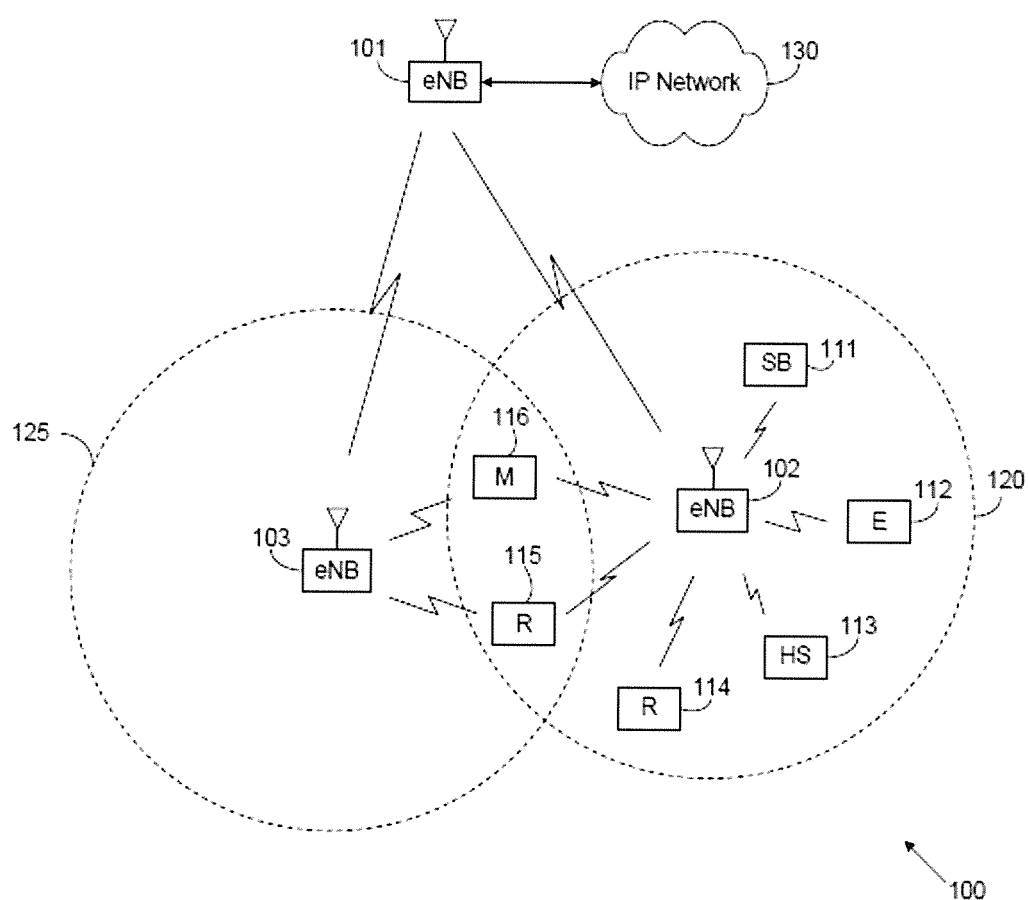
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 115, which may be located in a first residence (R); a UE 116, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide support for UL transmissions in dual connectivity operation.

One or more of the eNBs 101-103 are configured to determine a first subset of UE transmitter antennas from a set of the transmitter antennas included in a respective UE. The respective eNB 101-103 configures the UE to use the first subset of transmitter antennas for transmitting to the first base station. In certain embodiments, one or more of the eNBs 101-103 are configured to determine a first percentage of a maximum UE transmission power for transmissions from a UE to the first base station and a second percentage of the maximum UE transmission power for transmissions from the UE to a second base station. The respective eNB 101-103 also signals to the UE the first percentage of the maximum UE transmission power and the second percentage of the maximum UE transmission power.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly between them or with the network 130 and provide UEs with direct wireless broadband access to the network 130. Further, the eNB 101, 102, and/or 103 could provide access to other or additional external networks, such as external telephone networks or other types of data networks.

Figure 2:
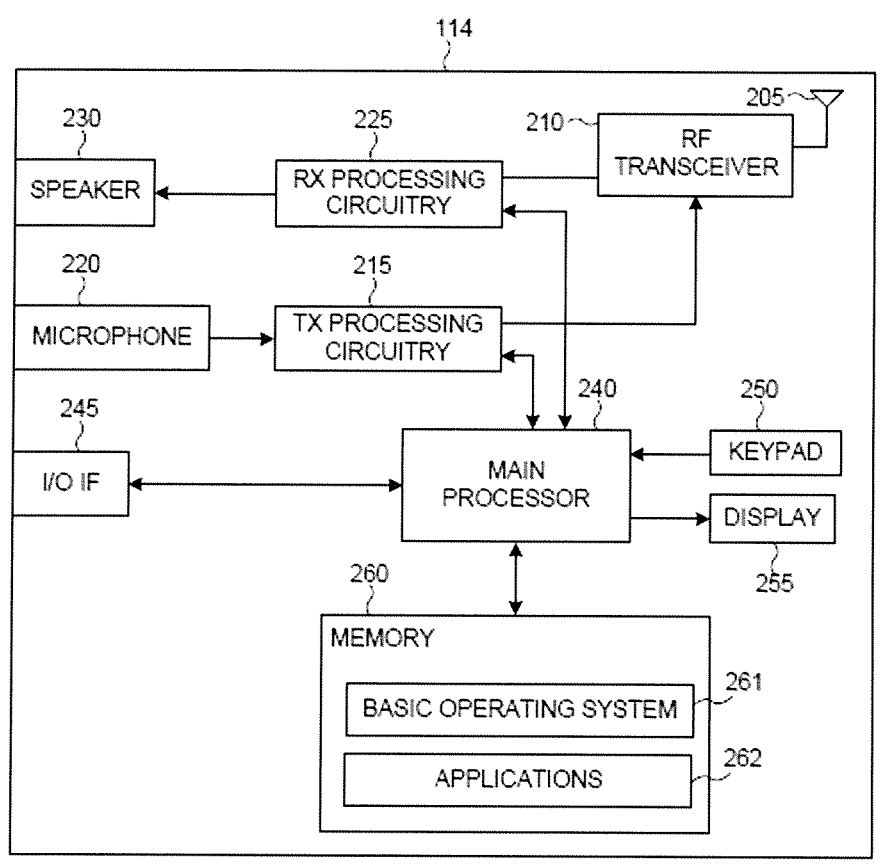
FIG. 2 illustrates an example user equipment (UE) according to this disclosure.

FIG. 2 illustrates an example UE 116 according to this disclosure. The embodiment of the UE 116 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 116 includes an antenna 205, a radio frequency (RF) transceiver 210, transmit (TX) processing circuitry 215, a microphone 220, and receive (RX) processing circuitry 225. The UE 116 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 116 and, if in a transmission time interval of one subframe (SF) the UE either reduces a transmission power to the first base station or reduces a transmission power to the second base station, the main processor 240 does not reduce the transmission power to the first base station below the first percentage of the maximum UE transmission power in the SF or the UE does not reduce the transmission power to the second base station below the second percentage of the maximum UE transmission power in the SF, respectively. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 116 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 116 can use the keypad 250 to enter data into the UE 116. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a control or data signaling memory (RAM), and another part of the memory 260 could include a Flash memory or other read-only memory (ROM).

As described in more detail below, the transmit and receive paths of the UE 116 (implemented using the RF transceiver 210, TX processing circuitry 215, and/or RX processing circuitry 225) support UL transmissions in dual connectivity operation.

Although FIG. 2 illustrates one example of UE 116, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 116 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
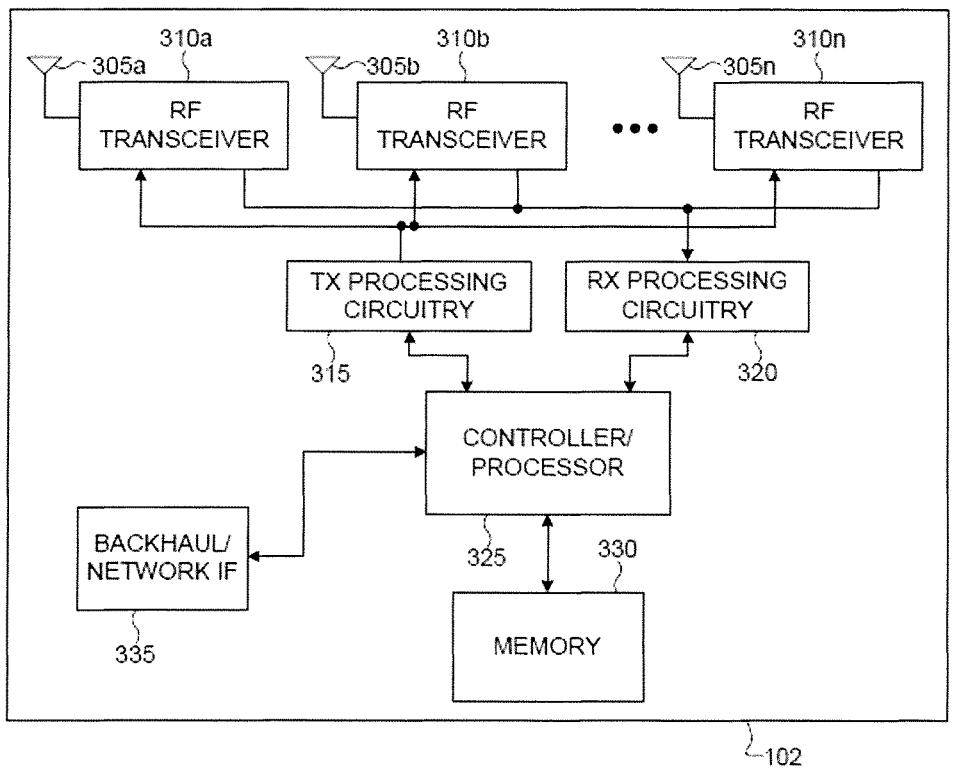
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process. The controller/processor 325 is configured to determine a first subset of UE transmitter antennas from a set of the transmitter antennas included in a respective UE. The controller/processor 325 configures the UE to use the first subset of transmitter antennas for transmitting to the first base station. In certain embodiments, controller/processor 325 is configured to determine a first percentage of a maximum UE transmission power for transmissions from a UE to the first base station and a second percentage of the maximum UE transmission power for transmissions from the UE to a second base station. The controller/processor 325 also signals to the UE the first percentage of the maximum UE transmission power and the second percentage of the maximum UE transmission power.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs, such as eNB 103, over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support UL transmissions in dual connectivity operation.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. An eNB, such as eNB 102, transmits DL signals using Orthogonal Frequency Division Multiplexing (OFDM). The eNB 102 can transmit data information through Physical DL Shared CHannels (PDSCHs). The eNB 102 can transmit DCI through Physical DL Control CHannels (PDCCHs) or through Enhanced PDCCHs (EPDCCHs)—see also REF 1. The eNB 102 can transmit one or more of multiple types of RS, including a UE-Common RS (CRS), a Channel State Information RS (CSI-RS), and a DeModulation RS (DMRS)—see also REF 1. The eNB 102 can transmit a CRS over a DL system BandWidth (BW). A CRS can be used by UEs, such as UE 116, to demodulate data or control signals or to perform measurements. To reduce CRS overhead, eNB 102 can transmit a CSI-RS with a smaller density than a CRS in the time or frequency domain. For channel measurement, Non-Zero Power CSI-RS (NZP CSI-RS) resources can be used. For Interference Measurements (IMs), CSI-IM resources associated with a Zero Power CSI-RS (ZP CSI-RS) can be used. The eNB 102 transmits DMRS only in the BW of a respective PDSCH or EPDCCH. The UE 116 can use the DMRS to demodulate information in a PDSCH or EPDCCH. A RS is associated with a logical antenna port that is mapped to a physical antenna in an implementation specific manner (see also REF 1).

UL signals also include data signals conveying information content, control signals conveying UL Control Information (UCI), and RS. UE 116 transmits data information or UCI through a respective Physical UL Shared CHannel (PUSCH) or a Physical UL Control CHannel (PUCCH). If UE 116 simultaneously transmits data information and UCI, UE 116 can multiplex both in a PUSCH. UCI includes Hybrid Automatic Repeat reQuest ACKnowledgement (HARQ-ACK) information, indicating correct or incorrect detection of data Transport Blocks (TBs) in a PDSCH or detection of a DCI format indicating a release of a Semi-Persistently Scheduled (SPS) PDSCH, Scheduling Request (SR) indicating whether UE 116 has data in its buffer, and Channel State Information (CSI) enabling eNB 102 to select appropriate parameters for PDSCH transmissions to UE 116. HARQ-ACK information includes a positive ACKnowledgement (ACK) in response to a correct (E)PDCCH or data TB detection, a Negative ACKnowledgement (NACK) in response to an incorrect data TB detection, and an absence of a (E)PDCCH detection (DTX) which can be implicit (that is, UE 116 does not transmit a HARQ-ACK signal) or explicit if UE 116 can identify missed (E)PDCCHs by other means (it is also possible to represent NACK and DTX with a same NACK/DTX state). For initial access or for subsequent synchronization purposes, UE 116 can also be configured by eNB 102 to transmit a Physical Random Access CHannel (PRACH). UL RS includes DMRS and Sounding RS (SRS)—see also REF 1. UE 116 transmits DMRS only in a BW of a respective PUSCH or PUCCH and eNB 102 can use a DMRS to demodulate information in a PUSCH or PUCCH. UE 116 transmits SRS to provide eNB 102 with an UL CSI. Similar to DL RS, an UL RS type (DMRS or SRS) is identified by a respective antenna port. A transmission time unit for DL transmissions or UL transmissions is a Sub-Frame (SF).

A transmission power for a PUSCH, or a PUSCH, or a SRS is determined according to a respective UL power control process (see also REF 3). A UE, such as UE 116, can inform an eNB, such as eNB 102, using a Power Headroom Report (PHR) of an available power UE 116 has beyond one for a PUSCH or PUCCH transmission in a respective SF, regardless of whether UE 116 has an actual PUSCH or PUCCH transmission (see also REF 3 and REF 4). UE 116 can trigger a PHR by a change in a path-loss beyond a threshold or by some periodic timer.

Figure 4:
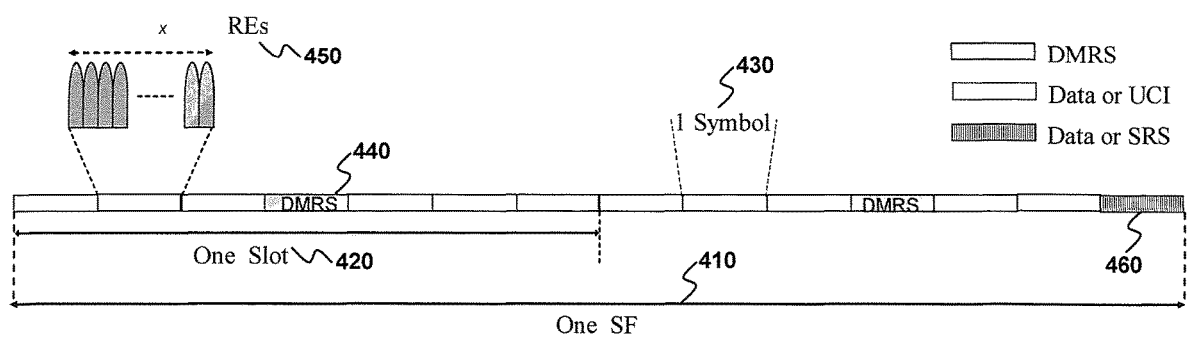
FIG. 4 illustrates an example UL SF structure for PUSCH transmission according to this disclosure.

FIG. 4 illustrates an example UL SF structure for PUSCH transmission according to this disclosure. The embodiment of the UL SF structure shown in FIG. 4 is for illustration only. Other embodiments could be used without departing from the scope of the present disclosure.

UL signaling uses Discrete Fourier Transform Spread OFDM (DFT-S-OFDM). An UL SF 410 includes two slots. Each slot 420 includes $N_{symb}^{UL}$ symbols 430 where a UE transmits data information, UCI, or RS. The UE uses one or more symbols in each slot to transmit DMRS 440. A transmission BW includes frequency resource units that are referred to as Resource Blocks (RBs). Each RB includes $N_{sc}^{RB}$ sub-carriers, or Resource Elements (REs). The UE is allocated $M_{PUSCH}$ RBs 450 for a total of $M_{sc}^{PUSCH}=M_{PUSCH} \cdot N_{sc}^{RB}$ REs for a PUSCH transmission BW. The UE is allocated 1 RB for a PUCCH transmission. A last SF symbol can be used to multiplex SRS transmissions 460 from one or more UEs. A number of UL SF symbols available for data/UCI/DMRS transmission is $N_{symb}^{PUSCH}=2 \cdot (N_{symb}^{UL}-1)-N_{SRS}$. $N_{SRS}=1$ if a last UL symbol supports SRS transmissions from UEs that overlap at least partially in BW with a PUSCH transmission BW; otherwise, $N_{SRS}=0$. A transmission unit of 1 RB over 1 SF is referred to as a Physical RB (PRB).

A PDSCH transmission to a UE or a PUSCH transmission from a UE, such as UE 116, can be triggered either by dynamic scheduling or by SPS. Dynamic scheduling is by a DCI format that is conveyed by a PDCCH or an EPDCCH and includes fields providing PDSCH or PUSCH transmission parameters. UE 116 always monitors a DCI format 1A for PDSCH scheduling and a DCI format 0 for PUSCH scheduling. These two DCI formats are designed to have a same size and can be jointly referred to as DCI Format 0/1A. Another DCI format, DCI format 1C, in a respective (E)PDCCH can schedule a PDSCH providing System Information (SI) for network configuration parameters to a group of UEs, or a response to PRACH transmissions by UEs, or paging information to a group of UEs, and so on. Another DCI format, DCI format 3 or DCI format 3A (can be jointly referred to as DCI format 3/3A) can provide Transmission Power Control (TPC) commands to a group of UEs for transmissions of respective PUSCHs or PUCCHs.

A DCI format includes Cyclic Redundancy Check (CRC) bits in order for UE 116 to confirm a correct DCI format detection. A DCI format type is identified by a Radio Network Temporary Identifier (RNTI) that scrambles the CRC bits. For a DCI format scheduling a PDSCH or a PUSCH to a single UE (unicast scheduling), the RNTI is a Cell RNTI (C-RNTI). For a DCI format scheduling a PDSCH conveying SI to a group of UEs (broadcast scheduling), the RNTI is a SI-RNTI. For a DCI format scheduling a PDSCH providing a response to PRACH transmissions from a group of UEs, the RNTI is a RA-RNTI. For a DCI format scheduling a PDSCH that pages a group of UEs, the RNTI is a P-RNTI. For a DCI format providing TPC commands to a group of UEs, the RNTI is a TPC-RNTI. Each RNTI type is configured to UE 116 through higher layer signaling, such as Radio Resource Control (RRC) signaling (see also REF 5), by eNB 102 (and the C-RNTI is unique for each UE). SPS transmission parameters are configured to UE 116 from eNB 102 through higher layer signaling and, for a DCI format associated with a SPS release, the RNTI is a SPS-RNTI.

In all remaining descriptions, unless explicitly noted otherwise, a configuration of a parameter to UE 116 refers to higher layer signaling of the parameter to UE 116 and higher layer signaling refers to RRC signaling or MAC signaling.

Figure 5:
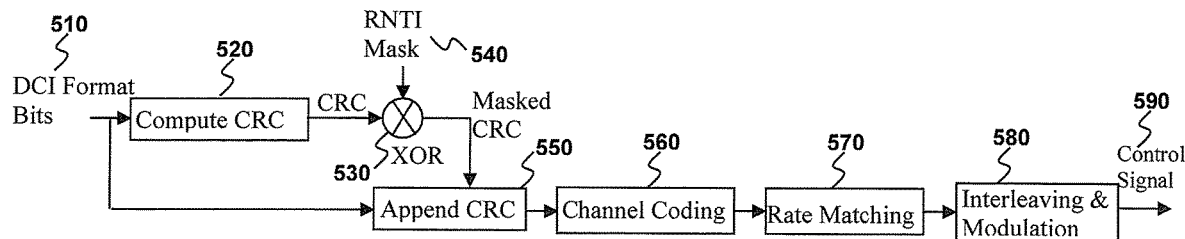
FIG. 5 illustrates an example encoding process for a DCI format according to this disclosure.

FIG. 5 illustrates an example encoding process for a DCI format according to this disclosure. The embodiment of the encoding process shown in FIG. 5 is for illustration only. Other embodiments could be used without departing from the scope of the present disclosure.

The eNB 102 separately codes and transmits each DCI format in a respective (E)PDCCH. A RNTI for UE 116, for which a DCI format is intended for, masks a CRC of a DCI format codeword in order to enable the UE to identify that a particular DCI format is intended for the UE. The CRC of (non-coded) DCI format bits 510 is computed using a CRC computation operation 520, and the CRC is then masked using an exclusive OR (XOR) operation 530 between CRC and RNTI bits 540. The XOR operation 530 is defined as: XOR(0,0)=0, XOR(0,1)=1, XOR(1,0)=1, XOR(1,1)=0. The masked CRC bits are appended to DCI format information bits using a CRC append operation 550, channel coding is performed using a channel coding operation 560 (such as an operation using a convolutional code), followed by rate matching operation 570 applied to allocated resources, and finally, an interleaving and a modulation 580 operation are performed, and the output control signal 590 is transmitted. In the present example, both a CRC and a RNTI include 16 bits.

Figure 6:
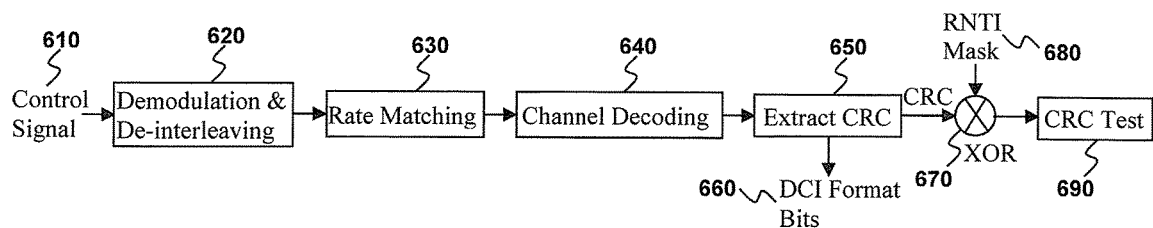
FIG. 6 illustrates an example decoding process for a DCI format according to this disclosure.

FIG. 6 illustrates an example decoding process for a DCI format according to this disclosure. The embodiment of the decoding process shown in FIG. 6 is for illustration only. Other embodiments could be used without departing from the scope of the present disclosure.

A received control signal 610 is demodulated and the resulting bits are de-interleaved at operation 620, a rate matching applied at the eNB 102 transmitter is restored through operation 630, and data is subsequently decoded at operation 640. After decoding the data, DCI format information bits 660 are obtained after extracting CRC bits 650, which are then de-masked 670 by applying the XOR operation with a UE RNTI 680. Finally, UE 116 performs a CRC test 690. If the CRC test passes and the contents of the DCI format are valid, the UE 116 determines that a DCI format corresponding to the received control signal 610 is valid and determines parameters for signal reception or signal transmission; otherwise, the UE 116 disregards the presumed DCI format.

One mechanism towards satisfying an ever increasing demand for network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. Simultaneous UE connectivity to a macro cell and one or more small cells, where a UE maintains its RRC connection to a macro cell that provides a large coverage area while having a simultaneous connection to a small cell for data offloading, can avoid frequent handovers while allowing for high data rates. By maintaining the RRC connection to the macro-cell, communication with the small cell can be optimized as control-plane (C-plane) functionalities such as mobility management, paging, and system information updates can be provided only by the macro-cell while a small-cell can be dedicated for user plane (U-plane) communications.

One important aspect of a UE communication with multiple cells is a latency of a backhaul link between, for example, an eNB of a small-cell and an eNB of a macro-cell. If the latency of the backhaul link can be practically zero, scheduling decisions can be made by a central entity and conveyed to each network node. Also, feedback from a UE can be received at any network node and conveyed to the central entity to facilitate a proper scheduling decision for the UE. This type of operation is referred to as carrier aggregation (see also REF 3).

If the latency of the backhaul link is not zero, it is not feasible in practice to use a central scheduling entity as the latency of the backhaul link will accumulate each time there is communication between a network node and the central scheduling entity thereby introducing unacceptable delay for a UE communication. Then, it is necessary that scheduling decisions are individually performed at each of the network nodes that are connected by a backhaul link with non-zero latency. Also, feedback signaling from a UE associated with scheduling from a network node needs to be received by the same network node. This type of operation is referred to as dual connectivity.

Several realizations exist to achieve operation with dual connectivity. A determining factor can be availability at the UE of multiple transmitter antennas to enable simultaneous transmission on two different carrier frequencies. For brevity, the specifics of each possible realization to support dual connectivity are not discussed.

Figure 7:
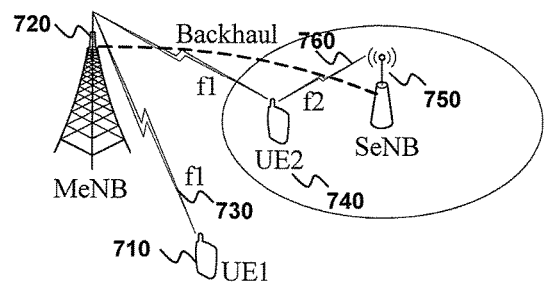
FIG. 7 illustrates an example communication system using dual connectivity according to this disclosure.

FIG. 7 illustrates an example communication system using dual connectivity according to this disclosure. The embodiment of dual connectivity shown in FIG. 7 is for illustration only. Other embodiments could be used without departing from the scope of the present disclosure.

A first UE such as UE 114, UE1 710, communicates in single connectivity with an eNB of a macro-cell such as eNB 102, that is referred to as Master eNB (MeNB) 720, using a first carrier frequency f1 730. A second UE such as UE 116, UE2 740, communicates in dual connectivity both with MeNB 710 over carrier frequency f1 730 and with an eNB of a small cell such as eNB 103, that is referred to as Secondary eNB (SeNB) 750, over carrier frequency f2 760.

A UE, such as UE 116, with two transmitter antennas can support dual connectivity using one antenna to transmit to a MeNB, such as eNB 102, and the other antenna to transmit to a SeNB, such as eNB 103. One important aspect for this operation is for UE 116 to determine first and second transmitter antennas to transmit to MeNB 102 and to SeNB 103, respectively. If both transmitter antennas are exactly equivalent, UE 116 can arbitrarily select one. However, transmitter antennas are practically never equivalent as one can experience a much larger propagation loss than the other due to Antenna Gain Imbalance (AGI). For example, AGI can occur due to a user's body placement or due to an orientation relative to a location of MeNB 102 or a SeNB 103. An AGI in the order of 3 decibel (dB) or 6 dB is typical. Therefore, significant reductions in coverage can occur if UE 116 selects for communication with MeNB 102 a transmitter antenna experiencing an additional propagation loss in the order of 6 dB. Moreover, by increasing a transmission power from a first transmitter antenna, a transmission power from a second transmitter antenna may need to decrease in order to avoid exceeding a specific upper bound in a total transmission power. This can also be disadvantageous as decreasing a transmission power from a second transmitter antenna can result in reduced achievable data rates for communication with SeNB 103.

When a UE communicates with a single eNB, or when the UE communicates with multiple eNBs that are connected over ideal backhaul, it is possible for a scheduling entity to dynamically indicate to the UE to use a specific antenna port. This is referred to as closed loop antenna selection. Operation with closed loop antenna selection can be limited to PUSCH and is associated with operation in a same carrier frequency as multiple antennas share a same Radio-Frequency (RF) component. An eNB, such as eNB 102, can indicate to a UE, such as UE 114, an antenna port to use for a PUSCH transmission by applying an additional mask to scramble a CRC of a DCI format scheduling the PUSCH. The eNB 102 can apply the additional mask through an additional operation as in step 530 of FIG. 5. The eNB 102 can indicate to UE 114 a first antenna port to transmit a PUSCH by using a mask of all binary zeros (effectively, no additional masking is applied to a CRC of a DCI format beyond the one by a C-RNTI as in FIG. 5). The eNB 102 can indicate to UE 114 a second antenna port to transmit a PUSCH by using a mask with a last element being a binary one and all remaining elements being binary zeros. This additional masking operation requires eNB 102 to enable antenna port selection only to UEs having C-RNTIs with a zero value for the most significant bit. When antenna selection is configured to UE 114, SRS transmissions alternate consecutively among antenna ports in SFs configured to UE 114 from eNB 102 for SRS transmission. Antenna selection does not require UE 114 to have multiple transmitter antennas (multiple radio-frequency components such as filters or amplifier). Instead, antenna selection can apply among different antenna ports sharing a single RF chain.

Extending a conventional operation for closed loop antenna selection to different transmitter antennas is not possible in case of dual connectivity as a non-zero latency of a backhaul link between a MeNB and a SeNB necessitates respective independent and uncoordinated scheduling entities. Moreover, a MeNB and a SeNB typically operate in different carrier frequencies.

A power of an UL transmission by a UE, such UE 114, is controlled by an eNB, such as eNB 102, to achieve a desired target for a received Signal to Interference and Noise Ratio (SINR) while reducing interference to neighboring cells and controlling Interference over Thermal (IoT) noise thereby ensuring respective reception reliability targets. UL Power Control (PC) can include an Open-Loop (OL) component with cell-specific and UE-specific parameters and a Closed-Loop (CL) component associated with Transmission Power Control (TPC) commands eNB 102 provides to UE 114 through transmission of DCI formats.

In SF i, a PUSCH transmission power $P_{PUSCH,c}(i)$, a PUCCH transmission power $P_{PUCCH}(i)$, a SRS transmission power $P_{SRS}(i)$, and a PRACH transmission power $P_{PRACH}(i)$ are determined according to respective UL power control processes (see also REF 3). A transmission power determined according to an UL power control process will be referred to as nominal transmission power.

For operation with carrier aggregation, if a total nominal transmission power from a UE, such as UE 114, in SF i is larger than a maximum transmission power $P_{CMAX}(i)$ for UE 114 in SF i, UE 114 first allocates power to a PRACH transmission, if any. If UE 114 does not have a PRACH transmission, UE 114 first allocates power to a PUCCH transmission, if any. Subsequently, denoting by $\hat{P}$ the linear value of a transmission power P in dB per milliwatt (dBm), if $\hat{P}_{CMAX}(i) - \hat{P}_{PUCCH}(i) > 0$ and for PUSCH in a cell j that conveys UCI, if any, UE 114 allocates a power $P_{PUSCH,j}(i)$ according to $\hat{P}_{PUSCH,j}(i) = \min(\hat{P}_{PUSCH,j}(i), (\hat{P}_{CMAX}(i) - \hat{P}_{PUCCH}(i)))$. If $\hat{P}_{CMAX}(i) - \hat{P}_{PUCCH}(i) - \hat{P}_{PUSCH,j}(i) > 0$, UE 114 scales a nominal transmission power of each remaining PUSCH transmission by a same factor w(i) so that $$\sum_{c \ne j} w(i) \cdot \hat{P}_{PUSCH,c}(i) \le (\hat{P}_{CMAX}(i) - \hat{P}_{PUCCH}(i) - \hat{P}_{PUSCH,j}(i)).$$

UE 114 can also set w(i)=0 for one or more of remaining PUSCH transmissions (see also REF 3).

Similar to ensuring that a total UE transmission power in SF i is not larger than $P_{CMAX}(i)$ in case of operation with carrier aggregation, it also needs to be ensured that a total UE transmission power in one or more cells of a MeNB and in one or more cells of a SeNB in SF i is not larger than $P_{CMAX}(i)$ in case of operation with dual connectivity. If UE 116 is power limited (total nominal transmission power exceeds $P_{CMAX}(i)$), UE 116 can prioritize power allocation to transmitted channels or signals in a similar manner as UE 114 operating with carrier aggregation. For example, power allocation to PRACH transmissions in one or more cells is prioritized over other transmissions. For example, HARQ-ACK/SR transmission to MeNB 102 is prioritized over transmissions other than PRACH (see also REF 7). Therefore, an allocation of power can be according to a function performed by each transmission with PRACH having the highest priority, followed by HARQ-ACK/SR, followed by CSI, followed by data, while power to SRS is allocated last (see also REF 3 and REF 7).

A UE can indicate to an eNB an amount of power it has in addition to the power used for a current transmission through a PHR—see also REF 3. A positive PHR value indicates that the UE can increase its transmission power. The PHR is included in a MAC CE that is transmitted from the UE as part of its data in a PUSCH (see also REF 4). For example, if the UE does not transmit PUSCH in SF i for serving cell c, a type 1 PHR is computed as in Equation 1

$$PH_{type1,c}(i) = \tilde{P}_{CMAX,c}(i) - \{P_{O\_PUSCH,c}(1) + \alpha_c(1) \cdot PL_c + f_c(i)\}[dB] \qquad (1)$$

where (see also REF 3), $\tilde{P}_{CMAX,c}(i)$ is computed based on the requirements in REF 6, $P_{O\_PUSCH,c}(1)$ is a parameter provided by higher layer signaling to the UE and controlling a mean received SINR at the eNB, $\alpha_c(1)$ is a cell-specific parameter configured by higher layer signaling to the UE with $0 \le \alpha_c(1) \le 1$, $PL_c$ is a DL path-loss estimate calculated at the UE for serving cell c in deciBel (dB), and $f_c(i)$ is a function accumulating a CL TPC command $\delta_{PUSCH}(i)$ included in a DCI format scheduling a PUSCH transmission to the UE in SF i, or in a DCI Format 3, with $f(0)$ being a first value after reset of accumulation.

One or more embodiments of this disclosure provide mechanisms to enable a MeNB or a SeNB to measure a signal a UE transmits from a first antenna and a signal the UE transmits from a second antenna. One or more embodiments of this disclosure also provide mechanisms to support antenna selection for a UE operating with dual connectivity and to indicate to the UE a transmitter antenna for communication with a MeNB or with a SeNB. Finally, one or more embodiments of this disclosure provide mechanisms to avoid a total transmission power from a UE to a MeNB and to a SeNB exceeding a maximum transmission while avoiding penalizing coverage or achievable data rates.

In the following, for the first and the second embodiments, antenna selection is primarily considered between two UE transmitter antennas for operation dual connectivity with a MeNB and a SeNB. However, embodiments of this disclosure are not limited to two UE transmitter antennas or to two eNBs and can be applicable for more than two UE transmitter antennas or for more than two eNBs.

Embodiment 1: Indication of UE Transmitter Antennas for Dual Connectivity

The first embodiment illustrates that a UE capable for operation with dual connectivity, such as UE 116, first establishes initial connection with a MeNB, such as eNB 102. Subsequently, MeNB 102 configures UE 116 for operation with dual connectivity that includes a SeNB, such as eNB 103.

While UE 116 communicates with MeNB 102, the MeNB 102 can determine a propagation loss associated with each transmitter antenna of UE 116. For example, MeNB 102 can configure a SRS transmission from each antenna port of UE 116 and obtain an estimate of the propagation loss for each transmitter antenna port. It is also possible that MeNB 102 instructs UE 116 to perform such SRS transmissions to SeNB 103, after UE 116 is configured by MeNB 102 for operation with dual connectivity, and for SeNB 103 to inform MeNB 102 of respective measurements over a backhaul link. The MeNB 102 can then use this additional information in a selection of an antenna for transmissions from UE 116 to MeNB 102 or to SeNB 103. For example, based on the SRS receptions, a controller at MeNB 102 can determine a subset of the set of transmitter antennas for UE 116 for transmissions to MeNB 102 (or to SeNB 103).

Upon configuring initialization of dual connectivity to UE 116, MeNB 102 can include a configuration element, antenna_selection_SeNB, informing UE 116 of an antenna port to use for transmissions to SeNB 103. Equivalently, MeNB 102 can include a configuration element, antenna_selection_MeNB, informing UE 116 of an antenna port to use for transmissions to MeNB 102.

When UE 116 is equipped with two transmitter antennas, antenna_selection_SeNB can include one bit wherein a value of '0' can correspond to a transmitter antenna port UE 116 associates with a first SRS transmission and a value of '1' can correspond to a transmitter antenna port UE 116 associates with a second SRS transmission. When UE 116 is equipped with four transmitter antennas, antenna_selection_SeNB can include two pairs of two bits (or four bits) and an association with the transmitter antenna ports of UE 116 can be according to respective SRS transmissions (see also REF 3).

Figure 8:
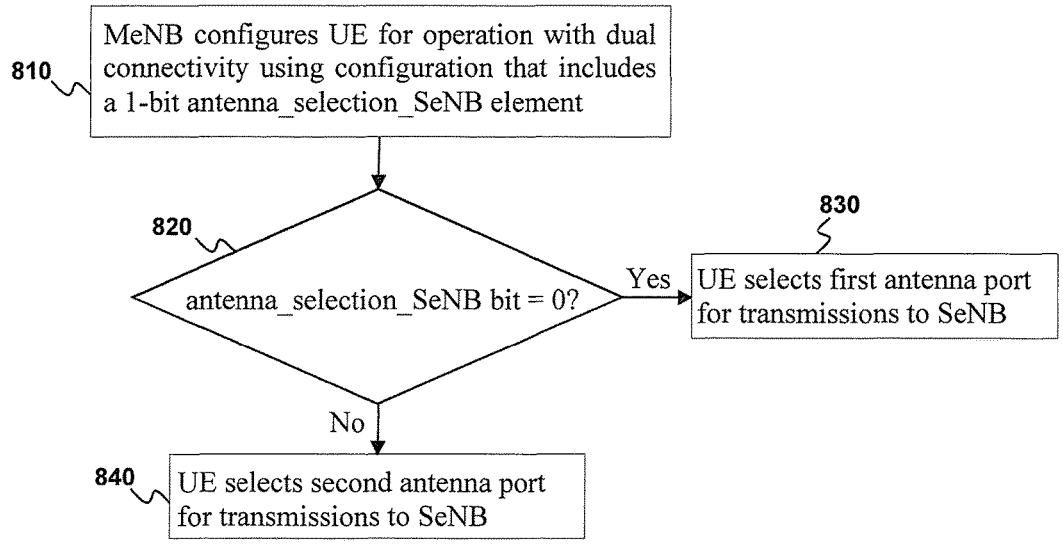
FIG. 8 illustrates an example selection of transmitter antenna ports for a UE with two transmitter antennas that is configured by a MeNB for operation with dual connectivity according to this disclosure.

FIG. 8 illustrates an example selection of transmitter antenna ports for a UE with two transmitter antennas that is configured by a MeNB for operation with dual connectivity according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a transmitter chain in, for example, a mobile station MeNB 102 configures UE 116 having two transmitter antenna ports for dual connectivity operation with SeNB 103 using a configuration that includes a 1-bit configuration element antenna_selection_SeNB (or a 1-bit configuration element antenna_selection_MeNB) 810. UE 116 examines whether a binary value of antenna_selection_SeNB is equal to zero 820. If the binary value of antenna_selection_SeNB is equal to zero (or if the binary value of antenna_selection_MeNB is equal to one), UE 116 selects for communication with SeNB 103 a first transmitter antenna port 830 (and selects for communication with MeNB 102 a second transmitter antenna port). For example, the first transmitter antenna port can correspond to SRS transmission from the first antenna port when UE 116 operates in single connectivity with MeNB 102. If the binary value of antenna_selection_SeNB is equal to one (or if the binary value of antenna_selection_MeNB is equal to zero), UE 116 selects for communication with SeNB 103 a second transmitter antenna port 840 (and selects for communication with MeNB 102 a first transmitter antenna port). For example, the second transmitter antenna port can correspond to SRS transmission from the second antenna port when UE 116 operates in single connectivity with MeNB 102. A configuration of antenna_selection_SeNB (or of antenna_selection_MeNB) by MeNB 102 to UE 116 is by higher layer signaling in a PDSCH and a conventional eNB transmitter structure and UE receiver structure can apply—a respective description is not repeated for brevity.

Embodiment 2: Indication of Transmitter Antenna after Configuration of Dual Connectivity The second embodiment illustrates an adaptation of a transmitter antenna port for a UE operating with dual connectivity, such as UE 116. Due to mobility or rearrangement of UE 116 position (orientation) relative to MeNB 102 or SeNB 103, a choice of UE 116 transmitter antenna port for communication with MeNB 102 or SeNB 103 can vary with time.

Figure 9:
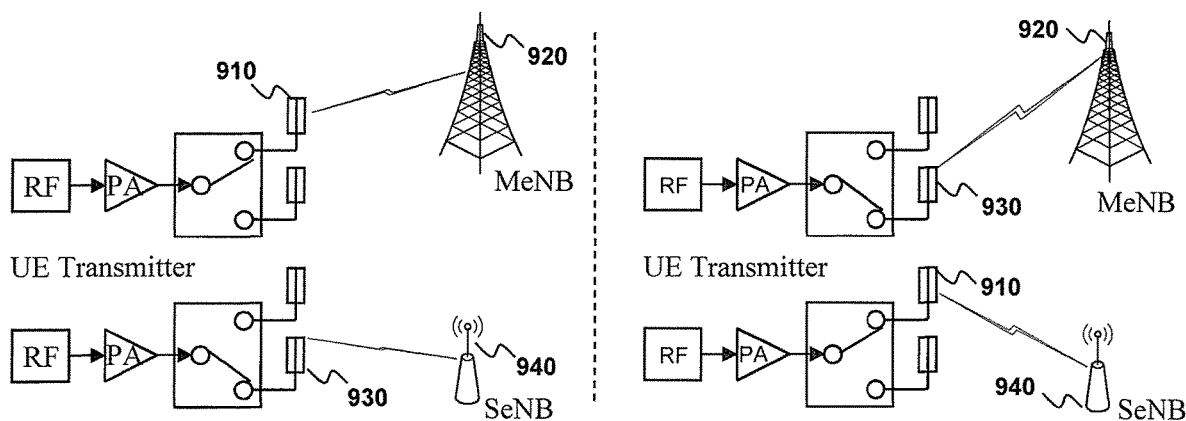
FIG. 9 illustrates an example UE transmitter antenna switching between a MeNB and a SeNB according to this disclosure.

FIG. 9 illustrates an example UE transmitter antenna switching between a MeNB and a SeNB according to this disclosure. The embodiment of UE transmitter antenna switching between a MeNB and a SeNB shown in FIG. 9 is for illustration only. Other embodiments could be used without departing from the scope of the present disclosure.

In some UL SFs, UE 116 uses a first antenna port 910 to transmit to MeNB 102 920 and a second antenna port 930 to transmit to SeNB 103 940. In some other UL SFs, based for example on signaling from MeNB 102, UE 116 uses the second antenna port 930 to transmit to MeNB 102 920 and the first antenna 910 port to transmit to SeNB 103 940.

To enable adaptation of a transmitter antenna port for UE 116 operating with dual connectivity, UE 116 can be allocated UL measurement gaps. During measurement gap UL SFs, UE 116 transmits signals, such as SRS, that can be received by MeNB 102 (or SeNB 103) wherein SRS transmissions are at least from antenna ports UE 116 uses to transmit signals to SeNB 103 (or MeNB 102, respectively) in other UL SFs. Contrary to a conventional use of measurement gaps where measurements are performed by a UE based on signals, such as a CRS, from respective transmission points, measurement gaps to enable UE 116 antenna port selection for communication with MeNB 102 or SeNB 103 are performed by MeNB 102 or SeNB 103 based on signals transmitted by antennas ports from UE 116. Measurement gaps can be a number of consecutive UL SFs (or, in general, either DL SFs or UL SFs), such as for example 1 UL SF or 2 UL SFs, and have a periodicity in a number of frames, such as for example 8 frames, where a frame includes 10 SFs. A SF offset can also be configured to UE 116 for measurement gap UL SFs. Multiplexing SRS transmissions from multiple transmitter antenna ports of UE 116 can be in a same symbol of a same SF using means for an assignment of respective SRS transmission parameters (see also REF 3). Measurement gap UL SFs can be configured to coincide for MeNB 102 and SeNB 103 in order to reduce an impact on DL transmissions to UE 116.

Figure 10:
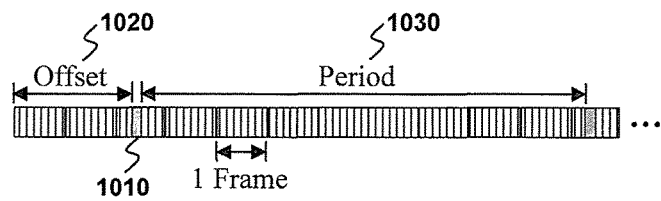
FIG. 10 illustrates a UE operation with single connectivity during measurement gap UL SFs and with dual connectivity in other UL SFs according to this disclosure.

FIG. 10 illustrates a UE operation with single connectivity during measurement gap UL SFs and with dual connectivity in other UL SFs according to this disclosure. The embodiment of UE operation shown in FIG. 10 is for illustration only. Other embodiments could be used without departing from the scope of the present disclosure.

UE 116 is configured with two measurement gap UL SFs 1010. The two measurement gap UL SFs can be, for example, for a carrier frequency corresponding to MeNB 102. The measurement gap UL SFs can also be with an offset value 1020 relative to a frame with System Frame Number (SFN) of 0. For example, the offset value can range between 0 and the value of the repetition period 1030 minus the number of measurement gap UL SFs. During measurement gap UL SFs, UE 116 transmits SRS from one or more antenna ports including at least the one or more antenna ports UE 116 uses to transmit to SeNB 103 in other UL SFs. A similar configuration can apply for SeNB 103 but a duplication of a description is omitted for brevity.

A configuration for measurement gap UL SFs can be communicated by MeNB 102 to both UE 116 and SeNB 103 so that SeNB 103 knows to avoid scheduling UE 116 in UL SFs that would require UL transmissions from UE 116 during measurement gap UL SFs. The configuration can include both UL SFs where UE 116 can transmit only to MeNB 102 and UL SFs where UE 116 can transmit only to SeNB 103 in case UE 116 is in an RRC_CONNECTED state. It can also be possible to support such measurement gaps for UEs in a RRC_IDLE state.

A separate configuration of parameters for SRS transmissions in measurement gaps UL SFs, compared to the configuration of parameters for SRS transmissions in other UL SFs, can be informed to UE 116. For example, a periodicity of SRS transmissions during measurement gaps UL SFs, if more than one, can be one UL SF while a periodicity of SRS transmissions in other SFs can be more than one UL SF. Alternatively, if a measurement gap UL SF coincides with an UL SF where a UE has a configured SRS transmission, a same configuration of parameters can be used for SRS transmission in the measurement gap UL SF but UE 116 transmits from a different antenna port. For example, if in a measurement gap UL SF UE 116 has configured SRS transmissions from a first antenna port to MeNB 102 and, with dual connectivity, UE 116 transmits to SeNB 103 using a second antenna port, the SRS transmission from the second antenna port can use the configured resources for the first antenna port.

Measurement gaps can also be dynamically triggered to UE 116 by MeNB 102, for example in response to a PHR from UE 116 indicating power limited operation. Then, instead of configuring measurement gaps UL SFs to occur periodically, UE 116 can be informed by MeNB 102, for example by higher layer signaling, a configuration of measurement gap UL SFs. Transmission parameters during measurement gap UL SFs, such as a starting SF after the triggering or a duration of measurement gap UL SFs, can be either predetermined in a system operation, or configured in advance to UE 116, or can be included in the higher layer signaling. Alternatively, instead of measurement gap UL SFs, MeNB 102 can direct UE 116 to switch transmitter antennas using either higher layer signaling or dynamic signaling as for antenna selection. Such capability may only be allowed to MeNB 102 (that is, SeNB 103 may not direct UE 116 to switch transmitter antennas).

Figure 11:
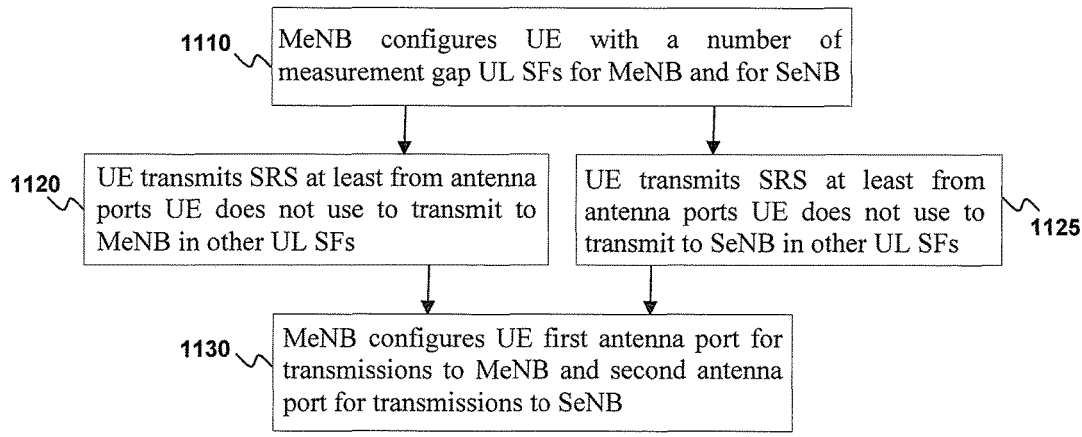
FIG. 11 illustrates a use of measurement gap UL SFs according to this disclosure.

FIG. 11 illustrates a use of measurement gap UL SFs according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a transmitter chain in, for example, a base station.

MeNB 102 configures UE 116 operating with dual connectivity that includes SeNB 103, with a number of one or more measurement gap UL SFs for MeNB 102 and SeNB 103 1110. An offset can also be configured. During measurement gap UL SFs for MeNB 102, UE 116 transmits SRS at least from antennas ports UE 116 uses to transmit signaling to SeNB 103 in other UL SFs 1120. During measurement gap UL SFs for SeNB 103, UE 116 transmits SRS at least from antenna ports UE 116 uses to transmit signaling to MeNB 102 in other UL SFs 1125. Based on measurements from SRS transmissions in step 1120 and in step 1125, MeNB 102 configures UE 116 a first antenna port for transmissions to MeNB 102 and a second antenna port for transmissions to SeNB 103 1130. This configuration can also be based on feedback, from SeNB 103 to MeNB 102 over a backhaul link, of the SRS measurements in step 1125.

Embodiment 3: Allocation of Transmission Power Per Transmitter Antenna

The third embodiment illustrates setting a maximum guaranteed power for UE transmissions to a MeNB, such as eNB 102, and setting a maximum guaranteed power for UE transmissions to a SeNB, such as eNB 103. Alternatively, the third embodiment considers setting a minimum guaranteed power for UE transmissions to a MeNB, such as eNB 102, and setting a minimum guaranteed power for UE transmissions to a SeNB, such as eNB 103. A requirement for a total maximum transmission power in SF i, $P_{CMAX}(i)$, to both MeNB and SeNB is considered to be either predefined or configured to UE 116 as for operation with single eNB connectivity (see also REF 3 and REF 6).

Due to independent schedulers at MeNB 102 and SeNB 103 and a non-zero latency of a backhaul link between MeNB 102 and SeNB 103, it is possible for UE 116 to have first transmissions to MeNB 102 and second transmissions to SeNB 103 in SF i. As the two transmissions are mutually independent, their respective nominal powers are independently determined and the total value can exceed a maximum UE transmission power $P_{CMAX}(i)$.

If UE 116 transmits only to MeNB 102 or only to SeNB 102 in in SF i, a maximum transmission power can be $P_{CMAX}(i)$. For example, if MeNB 102 uses Frequency Division Duplexing (FDD) and SeNB 103 uses Time Division Duplexing (TDD), UE 116 can assume a maximum available power of $P_{CMAX}(i)$ for transmissions to MeNB 102, at least in SFs that fully overlap with DL SFs at SeNB 103 (for synchronous operation between MeNB 102 and SeNB 103 as defined in REF 3). Asynchronous operation occurs when SF overlapping exceeds a fraction of a SF symbol. For example, for asynchronous operation, UE 116 can assume a maximum available power of $P_{CMAX}(i)$ for transmissions to MeNB 102 in a SF when SeNB 103 uses TDD and the SF overlaps with two DL SFs in SeNB 103. Therefore, based on information from SeNB 103 to MeNB 102 of a UL/DL configuration used by SeNB 103 (possibly of multiple UL/DL configurations if UE 116 communicates in multiple respective cells of SeNB 103) over a backhaul link, MeNB 102 can use this information in scheduling UE 116. For example, a higher UL spectral efficiency associated with a larger data TB requiring a higher transmission power by UE 116 can be targeted in SFs that are DL SFs at SeNB 103. Similar, as MeNB 102 and SeNB 103 can configure different Discontinuous Reception (DRX) patterns for UE 116, where UE 116 does not transmit or receive signaling while on DRX mode, MeNB 102 and SeNB 103 can exchange DRX patterns over a backhaul link.

A conventional approach to satisfy a condition for a total transmission power in SF i to not exceed $P_{CMAX}(i)$ is to equally split $P_{CMAX}(i)$ among UE 116 transmissions to MeNB 102 and SeNB 103. However, such a partitioning of a maximum transmission power is suboptimal as it does not consider requirements for UE 116 transmission power to MeNB 102 or to SeNB 103. For example, always restricting to $P_{CMAX}(i)/2$ a maximum power for UE 116 transmissions to MeNB 102 results to a reduction in cell coverage by a factor of 2. Then, even though UE 116 can be located far from MeNB 102 (near an edge of a macro-cell) and near SeNB 103 and can benefit from dual connectivity, UE 116 may not be able to maintain a connection to MeNB 102 after it is configured to operate with dual connectivity due to coverage reduction. Conversely, as SeNB 103 typically serves a small-cell, restricting to $P_{CMAX}(i)/2$ a maximum power for an antenna port UE 116 uses to transmit to SeNB 103 is of little consequence as a maximum transmission power required in practice is typically much smaller than $P_{CMAX}(i)/2$. However, if UL throughput to SeNB 103 is to be maximized for UE 116 and UE 116 is not near coverage limiting conditions for MeNB 102, a larger power can be allocated for UL transmissions to SeNB 103 than when UE 116 is near coverage limiting conditions for MeNB 102. Therefore, configurability of a transmission power of UE 116 to MeNB 102 or to SeNB 103, while ensuring that UE 116 maintains a communication link with both MeNB 102 and SeNB 103, is beneficial.

In order to improve a use of available power for transmissions from UE 116 to MeNB 102 and to SeNB 103 in SF i, a maximum power for UE transmissions to MeNB 102 and a maximum power for UE transmissions to SeNB 103, $P_{CMAX\_MeNB}(i)$ and $P_{CMAX\_SeNB}(i)$ respectively, can be configured to UE 116 by MeNB 102. In a linear domain, $\hat{P}_{CMAX\_MeNB}(i)+\hat{P}_{CMAX\_SeNB}(i)$ may not necessarily equal $\hat{P}_{CMAX}(i)$ and can be smaller than or larger than $\hat{P}_{CMAX}(i)$. Higher layer signaling for $\hat{P}_{CMAX\_MeNB}(i)$ or $\hat{P}_{CMAX\_SeNB}(i)$ can be in the form of a scaling factor (fraction), $f_{MeNB}$ or $f_{SeNB}$, respectively, of $\hat{P}_{CMAX}(i)$ ($\hat{P}_{CMAX\_MeNB}(i) = f_{MeNB} \cdot \hat{P}_{CMAX}(i)$, $\hat{P}_{CMAX\_SeNB}(i) = f_{SeNB} \cdot \hat{P}_{CMAX}(i)$). This enables a simple definition for $\hat{P}_{CMAX\_MeNB}(i)$ or $\hat{P}_{CMAX\_SeNB}(i)$ while considering variations of $P_{CMAX}(i)$ across SFs. A configuration of $f_{MeNB}$ or $f_{SeNB}$ (and therefore a configuration of $\hat{P}_{CMAX\_MeNB}(i)$ or $\hat{P}_{CMAX\_SeNB}(i)$) by MeNB 102 to UE 116 is by higher layer signaling in a PDSCH and a conventional eNB transmitter structure and UE receiver structure can apply—a respective description is not repeated for brevity. Moreover, a controller at MeNB 102 can determine values for $f_{MeNB}$ or $f_{SeNB}$ based, for example, on UE 116 coverage considerations or target data rates as it was described in the previous paragraph.

Prior to a configuration of $P_{CMAX\_MeNB}(i)$ or $P_{CMAX\_SeNB}(i)$, SeNB 103 can communicate over a backhaul link to MeNB 102 a required transmission power from UE 116 to SeNB 103. For UE 116, this required transmission power can be determined, for example, by a coverage area or interference characteristics associated with SeNB 103 for UE 116. $P_{CMAX\_SeNB}(i)$ (or, alternatively, a required transmission power from UE 116 to SeNB 103, $P_{CMIN\_SeNB}(i)$, as it is subsequently described) can be set so that this power requirement from UE 116 to SeNB 103 is satisfied. MeNB 102 can also communicate to SeNB 103 an allocation of $P_{CMAX\_MeNB}(i)$ and $P_{CMAX\_SeNB}(i)$ for UE 116 (or, alternatively, an allocation of required transmission power from UE 116 to MeNB 102, $P_{CMIN\_MeNB}(i)$, and of $P_{CMIN\_SeNB}(i)$ as it is subsequently described). For example, MeNB 102 can allocate to UE 116 having $P_{CMAX}(i)=23$ dB per milliwatt (dBm) $P_{CMAX\_MeNB}(i)=22.5$ dBm and $P_{CMAX\_SeNB}(i)=13$ dBm (in this case, $P_{CMAX\_MeNB}(i)+P_{CMAX\_SeNB}(i)=P_{CMAX}(i)$). This information can enable SeNB 103 to improve its scheduling decisions for UE 116 by knowing a value of $P_{CMAX\_MeNB}(i)$ (or a value of $P_{CMIN\_MeNB}(i)$) for MeNB 102.

Method 1: Setting a Maximum UE Transmission Power for a MeNB and a Maximum UE Transmission Power for a SeNB If, in SF i, UE 116 has a first UL transmission with power $P_{MeNB}(i)$ to MeNB 102 and a second UL transmission with power $P_{SeNB}(i)$ to SeNB 103 and $\hat{P}_{MeNB}(i)+\hat{P}_{SeNB}(i) > \hat{P}_{CMAX}(i)$, a power reduction of a total transmission power, $\hat{P}_{MeNB}(i)+\hat{P}_{SeNB}(i)$, to less than or equal to $\hat{P}_{CMAX}(i)$ can depend on the values of $P_{CMAX\_MeNB}(i)$ and $P_{CMAX\_SeNB}(i)$, or on the values of $P_{MeNB}(i)$ and $P_{SeNB}(i)$, instead of being same for both MeNB 102 and SeNB 103 for a same information type transmission to MeNB 102 and SeNB 103. This is because, for example, applying a same amount of power reduction for transmissions to MeNB 102 and to SeNB 103 can have a more degrading effect to transmissions to SeNB 103 as $P_{CMAX\_SeNB}(i)$ or $P_{SeNB}(i)$ can be much smaller than $P_{CMAX\_MeNB}(i)$ or $P_{MeNB}(i)$, respectively. This power reduction can apply when UE 116 transmits a same information type, such as data information or HARQ-ACK information, to both MeNB 102 and SeNB 103, while when different information types are transmitter, power allocation can be according to a relative priority of each information type (see also REF 3 and REF 7).

In a first alternative, a total transmission power from a UE in SF i to MeNB 102, $P_{MeNB}(i)$, is limited to not exceed $P_{CMAX\_MeNB}(i)$ and a total transmission power from UE 116 to a SeNB, $P_{SeNB}(i)$, is limited to not exceed $P_{CMAX\_SeNB}(i)$. In the first alternative, $P_{CMAX\_MeNB}(i)$ and $P_{CMAX\_SeNB}(i)$ act as upper bounds for a transmission power from UE 116 to MeNB 102 and to SeNB 103, respectively, when UE 116 is power limited ($\hat{P}_{MeNB}(i)+\hat{P}_{SeNB}(i) > \hat{P}_{CMAX}(i)$). UE 116 determines, according to respective UL power control processes, a transmission power $P_{MeNB}(i)$ to MeNB 102 and a transmission power $P_{SeNB}(i)$ to SeNB 103. If $P_{MeNB}(i) > P_{CMAX\_MeNB}(i)$ or if $P_{SeNB}(i) > P_{max\_SeNB}(i)$, UE 116 first sets $P_{MeNB}(i)=P_{CMAX\_MeNB}(i)$ or $P_{SeNB}(i)=P_{CMAX\_SeNB}(i)$, respectively, according to whether power allocation is prioritized according to information UE 116 transmits to MeNB 102 or according to information UE 116 transmits to SeNB 103. The first alternative can also apply when $P_{CMAX\_MeNB}(i)+P_{CMAX\_SeNB}(i)=P_{CMAX}(i)$ for asynchronous transmissions to MeNB and SeNB.

Denoting by $\hat{P}_{CMAX}(i)$, $\hat{P}_{CMAX\_MeNB}(i)$, $\hat{P}_{CMAX\_SeNB}(i)$, $\hat{P}_{MeNB}(i)$, and $\hat{P}_{SeNB}(i)$ the linear values of $P_{CMAX}$, $P_{CMAX\_MeNB}$, $P_{CMAX\_SeNB}$, $P_{MeNB}$ and $P_{SeNB}$, respectively, if a reduction of $\hat{P}_{reduce}(i)=\hat{P}_{MeNB}(i)+\hat{P}_{SeNB}(i)-\hat{P}_{CMAX}(i)$ in a total transmission power is required to avoid a total transmission power larger than $\hat{P}_{CMAX}(i)$, then in a first approach of the first alternative, UE 116 can reduce a transmission power to MeNB 102 by $\hat{P}_{reduce}(i)\cdot\hat{P}_{CMAX\_MeNB}(i)/(\hat{P}_{CMAX\_MeNB}(i)+\hat{P}_{CMAX\_SeNB}(i))$ (or by $\hat{P}_{reduce}(i)\cdot\hat{P}_{CMAX\_MeNB}(i)/\hat{P}_{CMAX}(i)$ if $\hat{P}_{CMAX\_MeNB}(i)+\hat{P}_{CMAX\_SeNB}(i)=\hat{P}_{CMAX}(i)$), and reduce a transmission power to SeNB by $\hat{P}_{reduce}(i)\cdot\hat{P}_{CMAX\_SeNB}(i)/(\hat{P}_{CMAX\_MeNB}(i)+\hat{P}_{CMAX\_SeNB}(i))$ (or by $\hat{P}_{reduce}(i)\cdot\hat{P}_{CMAX\_SeNB}(i)/\hat{P}_{CMAX}(i)$ if $\hat{P}_{CMAX\_MeNB}(i)+\hat{P}_{CMAX\_SeNB}(i)=\hat{P}_{CMAX}(i)$). Therefore, a function of $\hat{P}_{CMAX\_MeNB}(i)$ and $\hat{P}_{CMAX\_SeNB}(i)$ in accordance to the first approach is to control a power scaling for channels conveying a same information type that UE 116 transmits to MeNB 102 and SeNB 103 in case a total transmission power exceeds $\hat{P}_{CMAX}(i)$ by acting as power scaling factors ($\hat{P}_{CMAX\_MeNB}(i)$ and $\hat{P}_{CMAX\_SeNB}(i)$ are power scaling factors for determining a reduction in transmission power to MeNB 102 and SeNB 103, respectively, when $\hat{P}_{MeNB}(i)+\hat{P}_{SeNB}(i)>\hat{P}_{CMAX}(i)$ and each can a same value independently of SF i).

In a second approach of the first alternative, a reduction in transmission power from UE 116 to MeNB 102 can be computed as $\hat{P}_{reduce}(i)\cdot\hat{P}_{MeNB}(i)/(\hat{P}_{MeNB}(i)+\hat{P}_{SeNB}(i))$ and a reduction in transmission power to SeNB 103 can be computed as $\hat{P}_{reduce}(i)\cdot\hat{P}_{SeNB}(i)/(\hat{P}_{MeNB}(i)+\hat{P}_{SeNB}(i))$.

In a third approach of the first alternative, a reduction in transmission power to MeNB 102 can be computed as $\hat{P}_{reduce}(i)\cdot f_{MeNB}$ and a reduction in transmission power to SeNB 103 can be computed as $\hat{P}_{reduce}(i)\cdot f_{SeNB}$ where $f_{MeNB}$ and $f_{SeNB}$ are configured to UE 116 by MeNB 102 through higher layer signaling and, typically, $f_{MeNB}+f_{SeNB}=1$. As $\hat{P}_{CMAX\_MeNB}(i)/(\hat{P}_{CMAX\_MeNB}(i)+\hat{P}_{CMAX\_SeNB}(i))=f_{MeNB}/(f_{MeNB}+f_{SeNB})$ and $\hat{P}_{CMAX\_SeNB}(i)/(\hat{P}_{CMAX\_MeNB}(i)+\hat{P}_{CMAX\_SeNB}(i))=f_{SeNB}/(f_{MeNB}+f_{SeNB})$, the third approach is an alternative realization of the first approach and the first and third approaches are functionally equivalent.

Figure 12:
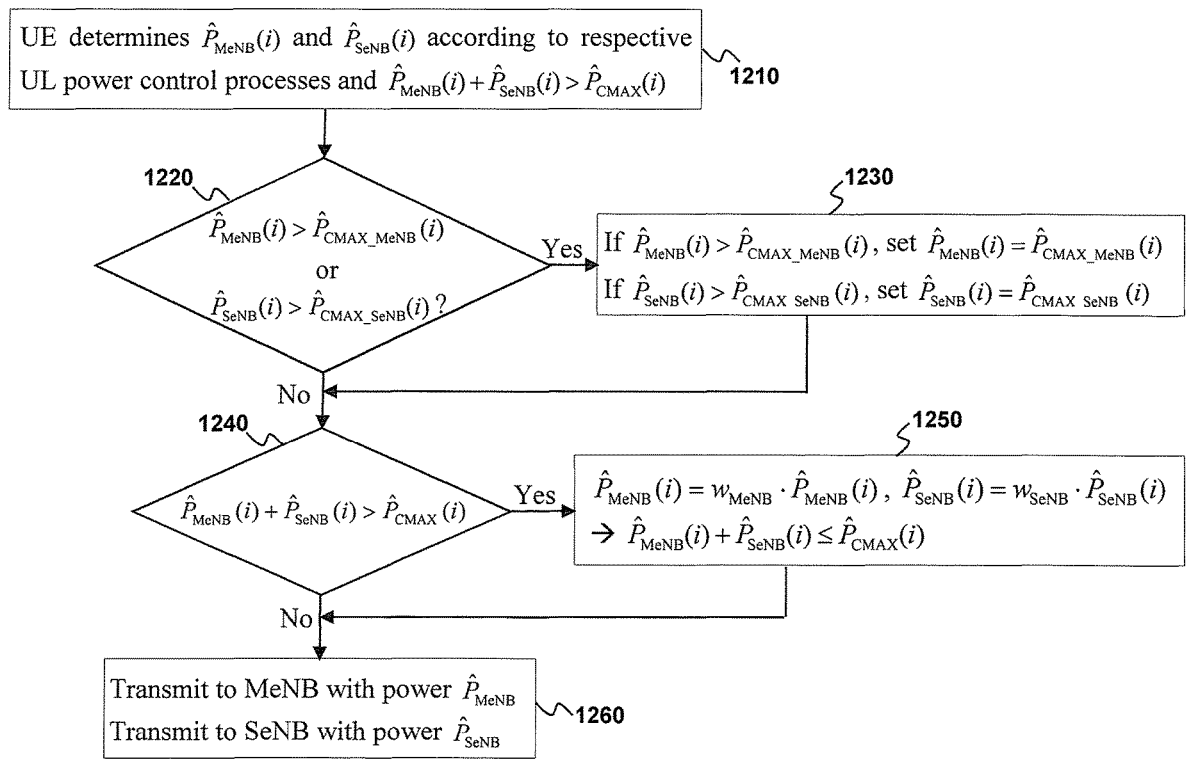
FIG. 12 illustrates a determination of a transmission power to a MeNB and of a transmission power to a SeNB in accordance to a first alternative according to this disclosure.

FIG. 12 illustrates a determination of a transmission power to a MeNB and of a transmission power to a SeNB in accordance to a first alternative according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a transmitter chain in, for example, a mobile station.

In SF i, UE 116 determines a power $\hat{P}_{MeNB}(i)$ for transmissions of channels or signals (PUCCH, PUSCH, PRACH, SRS) to MeNB 102 and a power $\hat{P}_{SeNB}(i)$ for transmissions of channels or signals (PUCCH, PUSCH, PRACH SRS) to SeNB 103 according to respective UL power control processes 1210 and that $\hat{P}_{MeNB}(i)+\hat{P}_{SeNB}(i)>\hat{P}_{CMAX}(i)$. UE 116 then determines whether $\hat{P}_{MeNB}(i)>\hat{P}_{MeNB\_max}(i)$ or $\hat{P}_{SeNB}(i)>\hat{P}_{SeNB\_max}(i)$ 1220 and, if so, UE 116 sets $\hat{P}_{MeNB}(i)=\hat{P}_{CMAX\_MeNB}(i)$ or $\hat{P}_{SeNB}(i)=\hat{P}_{CMAX\_SeNB}(i)$, respectively 1230, according to a relative priority of information types UE 116 transmits to MeNB 102 or SeNB 103. $\hat{P}_{CMAX\_MeNB}(i)$ and $\hat{P}_{CMAX\_SeNB}(i)$ can be configured to UE 116 by MeNB 102 by configuring respective fractions of $\hat{P}_{CMAX}(i)$, $f_{MeNB}$ and $f_{SeNB}$, as it was previously described. Subsequently, if $\hat{P}_{CMAX\_MeNB}(i)+\hat{P}_{CMAX\_SeNB}(i)>\hat{P}_{CMAX}(i)$ is enabled, UE 116 determines whether $\hat{P}_{MeNB}(i)+\hat{P}_{SeNB}(i)>\hat{P}_{CMAX}(i)$ 1240. If $\hat{P}_{MeNB}(i)+\hat{P}_{SeNB}(i)>\hat{P}_{CMAX}(i)$, UE scales $\hat{P}_{MeNB}(i)$ by a factor $w_{MeNB}$ and scales $\hat{P}_{SeNB}(i)$ by a factor $w_{SeNB}$ (when a same type of information is transmitted to both MeNB 102 and SeNB 103), so that $\hat{P}_{MeNB}(i)+\hat{P}_{SeNB}(i)\leq\hat{P}_{CMAX}(i)$ 1250. The scaling factors $w_{MeNB}$ and $w_{MeNB}$ can be either configured to UE 116 by MeNB 102 or be determined by UE 116 using other parameters, such as $\hat{P}_{CMAX\_MeNB}(i)$ and $\hat{P}_{CMAX\_SeNB}(i)$ or $\hat{P}_{MeNB}(i)$ and $P_{SeNB}(i)$, as it was previously described for the three approaches of the first alternative. Finally, UE 116 transmits channels or signals to MeNB 102 with $\hat{P}_{MeNB}(i)$ transmission power and transmits channels or signals to SeNB 103 with $\hat{P}_{SeNB}(i)$ transmission power 1260.

In a second alternative, a power for transmissions of channels or signals to MeNB 102 or to SeNB 103 is determined separately and independently for MeNB 102 and for SeNB 103. In SF i, UE 116 computes a power $\hat{P}_{MeNB}(i)$ for transmissions of channels or signals to MeNB 102 and a power $\hat{P}_{SeNB}(i)$ for transmissions of channels or signals to SeNB 103 using respective UL power control processes. If $\hat{P}_{MeNB}(i)+\hat{P}_{SeNB}(i)>\hat{P}_{CMAX}(i)$ and if $\hat{P}_{MeNB}(i)>\hat{P}_{CMAX\_MeNB}(i)$ or $\hat{P}_{SeNB}(i)>\hat{P}_{CMAX\_SeNB}(i)$, UE 116 either sets $\hat{P}_{MeNB}(i)=\hat{P}_{CMAX\_MeNB}(i)$ or sets $\hat{P}_{SeNB}(i)=\hat{P}_{CMAX\_SeNB}(i)$, respectively, depending on whether UE 116 prioritizes power allocation to MeNB 102 or SeNB 103. Assuming, for example, that UE 116 prioritizes power allocation to MeNB 102 then, for $\hat{P}_{CMAX\_MeNB}(i)+\hat{P}_{CMAX\_SeNB}(i)\leq\hat{P}_{CMAX}(i)$, UE 116 sets $\hat{P}_{MeNB}(i)$ as the smaller of (a) a nominal $\hat{P}_{MeNB}(i)$ and (b) the difference between $\hat{P}_{CMAX}(i)$ and the smaller of $\hat{P}_{SeNB}(i)$ and $\hat{P}_{CMAX\_SeNB}(i)$. Therefore, $\hat{P}_{MeNB}(i)=\min(\hat{P}_{CMAX}(i)-\min(\hat{P}_{CMAX\_SeNB}(i),\hat{P}_{SeNB}(i)),\hat{P}_{MeNB}(i))$. Then, $\hat{P}_{SeNB}(i)=\min(\hat{P}_{CMAX}(i)-\min(\hat{P}_{CMAX\_MeNB}(i),P_{MeNB}(i)),\hat{P}_{SeNB}(i))$.

Figure 13:
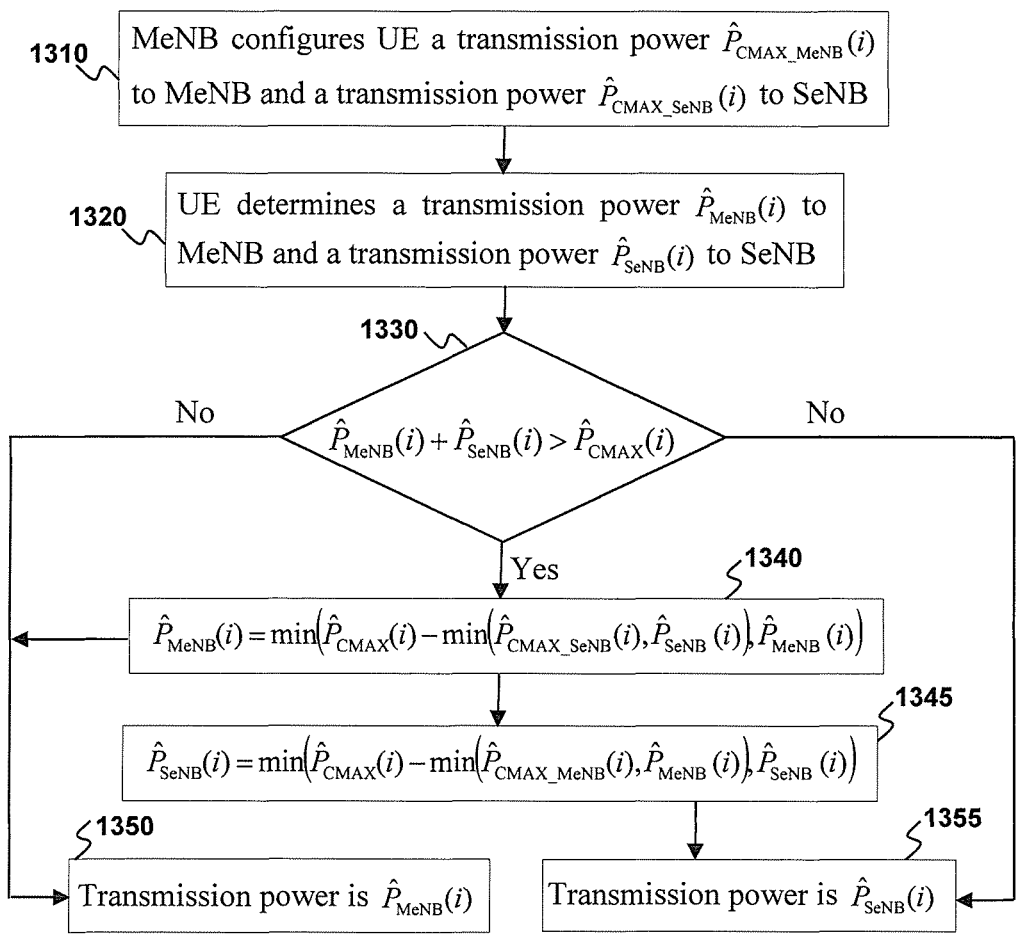
FIG. 13 illustrates a determination for a transmission power from a UE antenna to a MeNB and for a transmission power from a UE antenna to a SeNB in accordance to the second alternative according to this disclosure.

FIG. 13 illustrates a determination for a transmission power from a UE antenna to a MeNB and for a transmission power from a UE antenna to a SeNB in accordance to the second alternative according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a transmitter chain in, for example, a mobile station.

MeNB 102 configures to UE 116 a power $\hat{P}_{CMAX\_MeNB}(i)$ for transmissions to MeNB 102 and a power $\hat{P}_{CMAX\_SeNB}(i)$ for transmissions to SeNB 103 1310. Using respective power control processes for transmissions of channels or signals to MeNB 102 and for transmissions of channels or signals to SeNB 103, UE 116 determines in SF i a (nominal) transmission power $\hat{P}_{MeNB}(i)$ and a (nominal) transmission power $\hat{P}_{SeNB}(i)$ 1320. Assuming UE 116 prioritizes power allocation for transmissions to MeNB 102, UE 116 examines whether $\hat{P}_{MeNB}(i)+\hat{P}_{SeNB}(i)>\hat{P}_{CMAX}(i)$ 1330. If $\hat{P}_{MeNB}(i)+\hat{P}_{SeNB}(i)>\hat{P}_{CMAX}(i)$, UE 116 sets $P_{MeNB}(i)=\min(\hat{P}_{CMAX}(i)-\min(\hat{P}_{CMAX\_SeNB}(i),\hat{P}_{SeNB}(i)),\hat{P}_{MeNB}(i))$ 1340 and $\hat{P}_{SeNB}(i)=\min(\hat{P}_{CMAX}(i)-\min(\hat{P}_{CMAX\_MeNB}(i),P_{MeNB}(i)),\hat{P}_{SeNB}(i))$ 1345. Finally, UE 116 transmits to MeNB 102 using power $\hat{P}_{MeNB}(i)$ 1350 and transmits to SeNB 103 using power $\hat{P}_{SeNB}(i)$ 1355.

In a third alternative, in SF i, UE 116 uses $\hat{P}_{CMAX\_MeNB}(i)$ as a maximum transmission power to MeNB 102 or uses $\hat{P}_{CMAX\_SeNB}(i)$ as a maximum transmission power to a SeNB 103 only if a total transmission power from UE 116 exceeds $\hat{P}_{CMAX}(i)$; otherwise, UE 116 does not limit its transmission power to MeNB 102 to $\hat{P}_{CMAX\_MeNB}(i)$ and does not limit its transmission power to SeNB 103 to $\hat{P}_{CMAX\_SeNB}(i)$. If $\hat{P}_{CMAX\_MeNB}(i) + \hat{P}_{CMAX\_SeNB}(i) > \hat{P}_{CMAX}(i)$ and after limiting a transmission power to MeNB 102 to $\hat{P}_{CMAX\_MeNB}(i)$ and to SeNB 103 to $\hat{P}_{CMAX\_SeNB}(i)$, a total transmission power from UE 116 still exceeds $\hat{P}_{CMAX}(i)$, power reduction can apply so that for a final total transmission power from UE 116 to MeNB 102 ($\hat{P}_{MeNB}(i)$) and to SeNB 103 ($\hat{P}_{SeNB}(i)$) is $\hat{P}_{MeNB}(i) + \hat{P}_{SeNB}(i) \leq \hat{P}_{CMAX}(i)$.

A benefit of the third alternative is that, for $\hat{P}_{CMAX\_MeNB}(i) + \hat{P}_{CMAX\_SeNB}(i) \leq \hat{P}_{CMAX}(i)$, it limits a transmission power from UE 116 to either MeNB 102 to be $\hat{P}_{CMAX\_MeNB}(i)$ or to SeNB 103 to be $\hat{P}_{CMAX\_SeNB}(i)$ (according to a respective prioritization of power allocation) only if $\hat{P}_{MeNB}(i) + \hat{P}_{SeNB}(i) > \hat{P}_{CMAX}(i)$ and only if $\hat{P}_{MeNB}(i) > \hat{P}_{CMAX\_MeNB}(i)$ or $\hat{P}_{SeNB}(i) > \hat{P}_{CMAX\_SeNB}(i)$, respectively. Then, unlike the first alternative where they serve as scaling factors for reducing a transmission power to not exceed $\hat{P}_{CMAX}(i)$, in the third alternative $\hat{P}_{CMAX\_MeNB}(i)$ and $\hat{P}_{CMAX\_SeNB}(i)$ serve to distribute an available maximum power $\hat{P}_{CMAX}(i)$ in SF i to MeNB 102 and to SeNB 103 when nominal transmission powers by UE 116 (according to respective UL power control processes) are such that $\hat{P}_{MeNB}(i) + \hat{P}_{SeNB}(i) > \hat{P}_{CMAX}(i)$. This simplifies power allocation to MeNB 102 and to SeNB 103 in case UE 116 is configured for UL transmissions in multiple cells served by MeNB 102 or in multiple cells served by SeNB 103.

Figure 14:
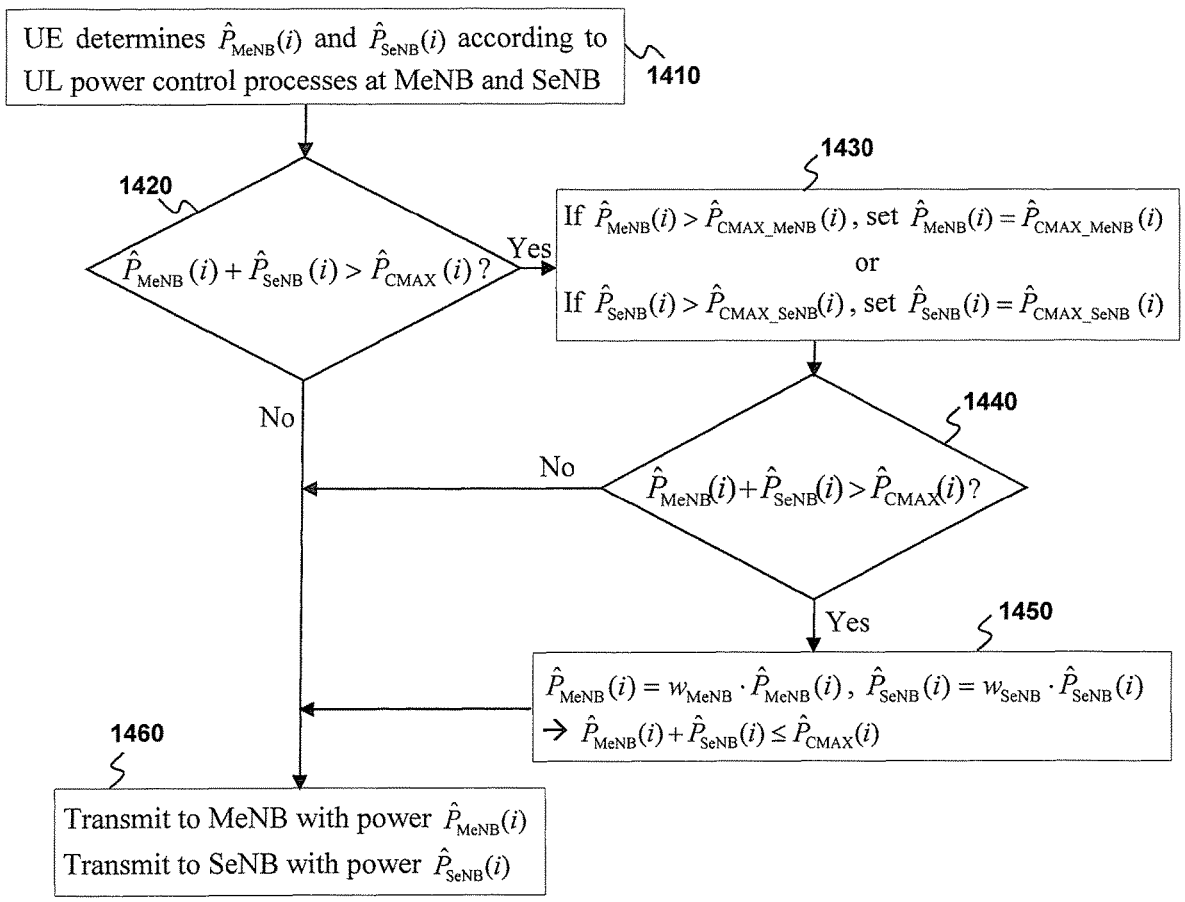
FIG. 14 illustrates a determination for a transmission power from a UE antenna transmitting to a MeNB and for a transmission power from a UE antenna transmitting to a SeNB in accordance to the third alternative according to this disclosure.

FIG. 14 illustrates a determination for a transmission power from a UE antenna transmitting to a MeNB and for a transmission power from a UE antenna transmitting to a SeNB in accordance to the third alternative according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a transmitter chain in, for example, a mobile station.

In SF i, UE 116 determines a power $\hat{P}_{MeNB}(i)$ for transmissions of channels or signals (such as PUCCH, PUSCH, PRACH, SRS) to MeNB 102 and a power $\hat{P}_{SeNB}(i)$ for transmissions of channels or signals (such as PUCCH, PUSCH, PRACH, SRS) to SeNB 103 according to respective UL power control processes 1410. UE 116 then determines whether $\hat{P}_{MeNB}(i) + \hat{P}_{SeNB}(i) > \hat{P}_{CMAX}(i)$ 1420. If $\hat{P}_{MeNB}(i) + \hat{P}_{SeNB}(i) > \hat{P}_{CMAX}(i)$, UE 116 determines whether $\hat{P}_{MeNB}(i) > \hat{P}_{CMAX\_MeNB}(i)$ or $\hat{P}_{SeNB}(i) > \hat{P}_{CMAX\_SeNB}(i)$ and, if so, UE 116 sets either $\hat{P}_{MeNB}(i) = \hat{P}_{CMAX\_MeNB}(i)$ or $\hat{P}_{SeNB}(i) = \hat{P}_{CMAX\_SeNB}(i)$ 1430 (according to whether UE 116 prioritizes power allocation to SeNB 103 or MeNB 102, respectively). Subsequently, UE 116 determines if $\hat{P}_{MeNB}(i) + \hat{P}_{SeNB}(i) > \hat{P}_{CMAX}(i)$ 1450 and, if so, UE 116 sets $\hat{P}_{MeNB}(i) = w_{MeNB} \cdot \hat{P}_{MeNB}(i)$ and $\hat{P}_{SeNB}(i) = w_{SeNB} \cdot \hat{P}_{SeNB}(i)$, at least when a same type of information is transmitted to both MeNB 102 and SeNB 103, so that $\hat{P}_{MeNB}(i) + \hat{P}_{SeNB}(i) \leq \hat{P}_{CMAX}(i)$ 1450. Finally, after step 1450, or if at step 1420 or step 1450 it is $\hat{P}_{MeNB}(i) + \hat{P}_{SeNB}(i) \leq \hat{P}_{CMAX}(i)$, UE 116 transmits channels or signals to MeNB 102 with $\hat{P}_{MeNB}(i)$ transmission power and transmits channels or signals to SeNB 103 with $\hat{P}_{SeNB}(i)$ transmission power 1460.

In a variation of the third alternative, in SF i, UE 116 can first examine whether reducing a transmission power to a first eNB, such as SeNB 103, to a first configured power avoids a total transmission power exceeding $\hat{P}_{CMAX}(i)$ before reducing a transmission power to a second eNB, such as MeNB 102, to a second configured power. For example, UE 116 can first examine whether reducing a transmission power to a SeNB to $\hat{P}_{CMAX\_SeNB}(i)$ avoids a total transmission power larger than $\hat{P}_{CMAX}(i)$ before reducing a transmission power to MeNB 102 to $\hat{P}_{CMAX}(i) - \hat{P}_{CMAX\_SeNB}(i)$ (when applicable). The eNB that UE 116 first considers reducing a transmission power to can be either predetermined according to a prioritization of respective information types (see also REF 3 and REF 7) with MeNB 102 being prioritized for a same information type, or be configured in conjunction with a configuration for operation with dual connectivity such as for example prioritizing an earlier transmission in case of asynchronous operation. Therefore, if $\hat{P}_{MeNB}(i) + \hat{P}_{SeNB}(i) > \hat{P}_{CMAX}(i)$, $\hat{P}_{MeNB}(i) > \hat{P}_{CMAX\_MeNB}(i)$, and $\hat{P}_{SeNB}(i) > \hat{P}_{CMAX\_SeNB}(i)$, UE 116 sets $\hat{P}_{SeNB}(i) = \hat{P}_{CMAX\_SeNB}(i)$ for SeNB 103 and allocates a remaining power to MeNB 102 ($\hat{P}_{MeNB}(i) = \hat{P}_{CMAX}(i) - \hat{P}_{CMAX\_SeNB}(i)$).

Figure 15:
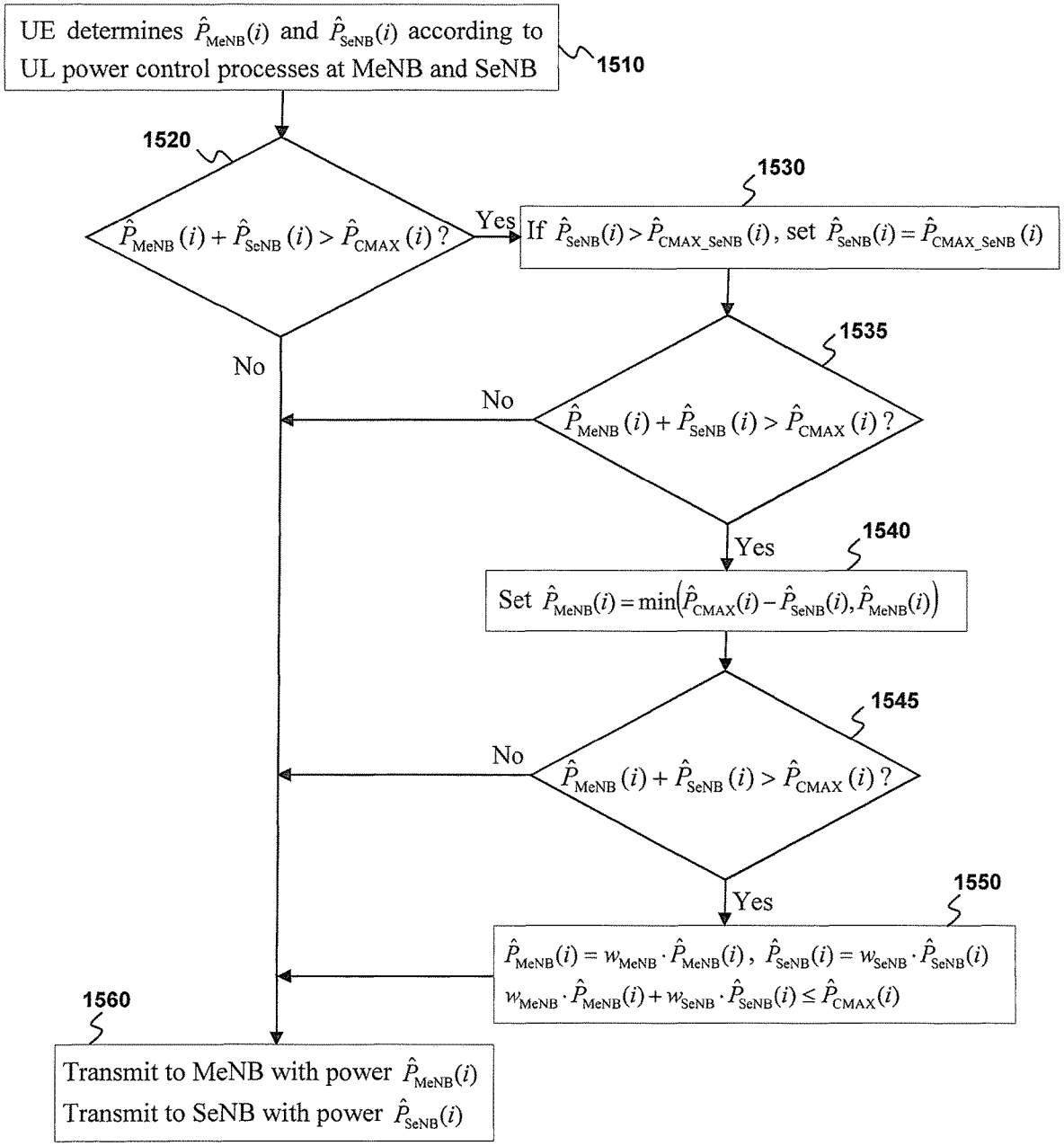
FIG. 15 illustrates a determination for a transmission power from a UE antenna transmitting to a MeNB and for a transmission power from a UE antenna transmitting to a SeNB in accordance to a variation of the third alternative according to this disclosure.

FIG. 15 illustrates a determination for a transmission power from a UE antenna transmitting to a MeNB and for a transmission power from a UE antenna transmitting to a SeNB in accordance to a variation of the third alternative according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a transmitter chain in, for example, a mobile station.

In SF i, UE 116 determines a power $\hat{P}_{MeNB}(i)$ for transmissions of channels or signals (such as PUCCH, PUSCH, PRACH, SRS) to MeNB 102 and a power $\hat{P}_{SeNB}(i)$ for transmissions of channels or signals (such as PUCCH, PUSCH, PRACH, SRS) to SeNB 103 according to respective UL power control processes 1510. UE 116 then determines whether $\hat{P}_{MeNB}(i) + \hat{P}_{SeNB}(i) > \hat{P}_{CMAX}(i)$ 1520. If $\hat{P}_{MeNB}(i) + \hat{P}_{SeNB}(i) > \hat{P}_{CMAX}(i)$, UE 116 determines whether $\hat{P}_{SeNB}(i) > \hat{P}_{CMAX\_SeNB}(i)$ and, if so, UE 116 sets $\hat{P}_{SeNB}(i) = \hat{P}_{CMAX\_SeNB}(i)$ 1530. Subsequently, UE 116 determines whether $\hat{P}_{MeNB}(i) + \hat{P}_{SeNB}(i) > \hat{P}_{CMAX}(i)$ 1535 and, if so, UE 116 sets $\hat{P}_{MeNB}(i) = \min(\hat{P}_{CMAX}(i) - \hat{P}_{SeNB}(i), \hat{P}_{MeNB}(i))$ 1540. Subsequently, if $\hat{P}_{CMAX\_MeNB}(i) + \hat{P}_{CMAX\_SeNB}(i) > \hat{P}_{CMAX}(i)$, UE 116 determines if $\hat{P}_{MeNB}(i) + \hat{P}_{SeNB}(i) > \hat{P}_{CMAX}(i)$ 1545 and, if so, UE 116 sets $\hat{P}_{MeNB}(i) = w_{MeNB} \cdot \hat{P}_{MeNB}(i)$ and $\hat{P}_{SeNB}(i) = w_{SeNB} \cdot \hat{P}_{SeNB}(i)$, at least when a same type of information is transmitted to both MeNB 102 and SeNB 103, so that $\hat{P}_{MeNB}(i) + \hat{P}_{SeNB}(i) \leq \hat{P}_{CMAX}(i)$ 1550. Finally, after step 1550, or if at step 1520 or step 1535, or step 1545 if $\hat{P}_{MeNB}(i) + \hat{P}_{SeNB}(i) \leq \hat{P}_{CMAX}(i)$, UE 116 transmits a channel to MeNB 102 with $\hat{P}_{MeNB}(i)$ transmission power and transmits a channel to SeNB 103 with $\hat{P}_{SeNB}(i)$ transmission power 1560.

If in SF i, UE 116 transmits data to MeNB 102 and to SeNB 103 in multiple cells served by MeNB 102 and in multiple cells served by SeNB 103, respectively, and if $\hat{P}_{MeNB}(i) + \hat{P}_{SeNB}(i) > \hat{P}_{CMAX}(i)$ with $\hat{P}_{MeNB}(i) > \hat{P}_{CMAX\_MeNB}(i)$ and $\hat{P}_{SeNB}(i) > \hat{P}_{CMAX\_SeNB}(i)$, a power allocation to each of the multiple cells can be individually performed for MeNB 102 (for MeNB cells) and for SeNB 103 (for SeNB cells), subject to a total respective transmission power from UE 116 not exceeding $\hat{P}_{CMAX\_MeNB}(i)$ or $\hat{P}_{CMAX\_SeNB}(i)$, respectively, when $\hat{P}_{CMAX\_MeNB}(i) + \hat{P}_{CMAX\_SeNB}(i) = \hat{P}_{CMAX}(i)$. Otherwise, if UE 116 is not configured by MeNB 102 values of $\hat{P}_{CMAX\_MeNB}(i)$ and $\hat{P}_{CMAX\_SeNB}(i)$, UE 116 can jointly perform a power allocation for data transmission to each of the multiple cells for MeNB 102 and SeNB 103 by scaling each transmission power by a same value so that a total resulting transmission power does not exceed $\hat{P}_{CMAX}(i)$ (for example, as in the second approach of the first alternative).

Method 2: Setting a Minimum UE Transmission Power for a MeNB and a Minimum UE Transmission Power for a SeNB For SF i, UE 116 can be configured by MeNB 102 a minimum transmission power to MeNB 102, $\hat{P}_{CMIN\_MeNB}(i)$, and a minimum transmission power to SeNB 103, $\hat{P}_{CMIN\_SeNB}(i)$. As for configuring $\hat{P}_{CMAX\_MeNB}(i)$ and $\hat{P}_{CMAX\_SeNB}(i)$, MeNB 102 can configure UE 116 respective fractions (percentages) $f_{MeNB}$ or $f_{SeNB}$ and UE 116 can derive a minimum guaranteed transmission power to MeNB 102 as $\hat{P}_{CMIN\_MeNB}(i)=f_{MeNB}\cdot\hat{P}_{CMAX}(i)$ and a minimum guaranteed transmission power to SeNB 103 as $\hat{P}_{CMIN\_SeNB}(i)=f_{SeNB}\cdot\hat{P}_{CMAX}(i)$. Two alternatives are considered for a functionality of $\hat{P}_{CMIN\_MeNB}(i)$ and $\hat{P}_{CMIN\_SeNB}(i)$.

In a first alternative, $\hat{P}_{CMIN\_MeNB}(i)$ and $\hat{P}_{CMIN\_SeNB}(i)$ serve as a lower bound beyond which a transmission power to MeNB 102 and SeNB 103, respectively, cannot be decreased (regardless of power prioritization according to information types). If power reduction is such that either $w_{MeNB}\cdot\hat{P}_{MeNB}(i)<\hat{P}_{CMIN\_MeNB}(i)$ or $w_{SeNB}\cdot\hat{P}_{SeNB}(i)<\hat{P}_{CMIN\_SeNB}(i)$, a transmission power is respectively set to either $\hat{P}_{CMIN\_MeNB}(i)$ or $\hat{P}_{CMIN\_SeNB}(i)$, respectively, and a transmission power to the other eNB is set such that either $\hat{P}_{SeNB}(i)\le\hat{P}_{CMAX}(i)-\hat{P}_{CMIN\_MeNB}(i)$ or $\hat{P}_{MeNB}(i)\le\hat{P}_{CMAX}(i)-\hat{P}_{CMIN\_SeNB}(i)$, respectively. Therefore, for prioritization of power allocation from UE 116 to MeNB 102 when $\hat{P}_{MeNB}(i)+\hat{P}_{SeNB}(i)>\hat{P}_{CMAX}(i)$, $\hat{P}_{MeNB}(i)=\min(\hat{P}_{CMAX}(i)-\min(\hat{P}_{CMIN\_SeNB}(i),\hat{P}_{SeNB}(i),\hat{P}_{MeNB}(i))$ and $\hat{P}_{SeNB}(i)=\min(\hat{P}_{CMAX}(i)-\min(\hat{P}_{CMIN\_MeNB}(i),\hat{P}_{MeNB}(i),\hat{P}_{SeNB}(i))$.

Figure 16:
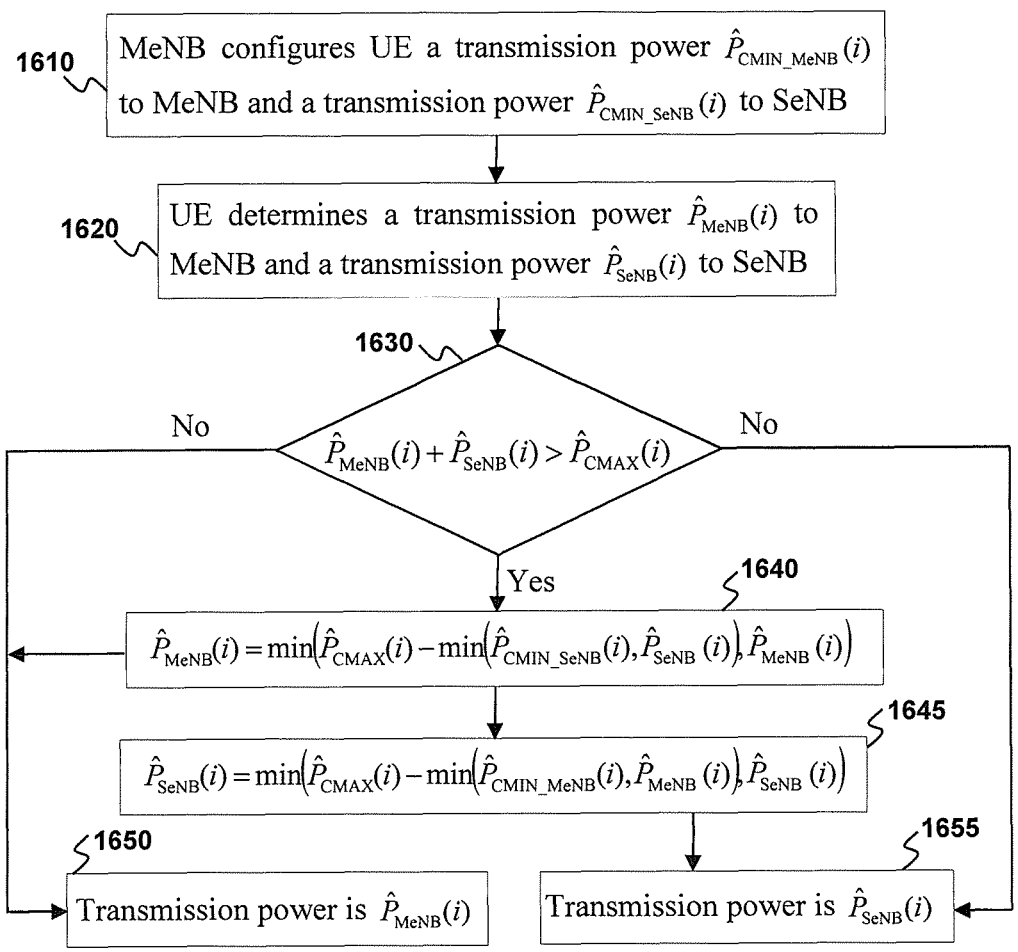
FIG. 16 illustrates a determination for a transmission power from a UE antenna transmitting to a MeNB and for a transmission power from a UE antenna transmitting to a SeNB in SF i using a guaranteed power, $\hat{P}_{CMIN\_MeNB}(i)$, for transmission to the MeNB and a guaranteed power, $\hat{P}_{CMIN\_SeNB}(i)$, for transmission to the SeNB according to this disclosure.

FIG. 16 illustrates a determination for a transmission power from a UE antenna transmitting to a MeNB and for a transmission power from a UE antenna transmitting to a SeNB in SF i using a guaranteed power, $\hat{P}_{CMIN\_MeNB}(i)$, for transmission to the MeNB and a guaranteed power, $\hat{P}_{CMIN\_SeNB}(i)$, for transmission to the SeNB according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in a transmitter chain in, for example, a mobile station.

MeNB 102 configures to UE 103 a minimum power $\hat{P}_{CMIN\_MeNB}(i)$ available for transmissions to MeNB 102 and with a minimum power $\hat{P}_{CMIN\_SeNB}(i)$ available for transmissions to SeNB 103 in SF i 1610. Using respective power control processes for transmissions of channels or signals to MeNB 102 and for transmissions of channels or signals to SeNB 103, UE 116 determines a transmission power $\hat{P}_{MeNB}(i)$ and a transmission power $\hat{P}_{SeNB}(i)$ 1620. If UE 116 prioritizes power allocation to MeNB 102, UE 116 examines whether $\hat{P}_{MeNB}(i)+\hat{P}_{SeNB}(i)>\hat{P}_{CMAX}(i)$ 1630 and, if so, UE 116 sets $\hat{P}_{MeNB}(i)=\min(\hat{P}_{CMAX}(i)-\min(\hat{P}_{CMAX\_SeNB}(i),\hat{P}_{SeNB}(i),\hat{P}_{MeNB}(i))$ 1640 and $\hat{P}_{SeNB}(i)=\min(\hat{P}_{CMAX}(i)-\min(\hat{P}_{CMAX\_MeNB}(i),\hat{P}_{MeNB}(i),\hat{P}_{SeNB}(i))$ 1645. Finally, UE 116 transmits to MeNB 102 using power $\hat{P}_{MeNB}(i)$ 1650 and transmits to SeNB 103 using power $\hat{P}_{SeNB}(i)$ 1655.

In a second alternative, if after UE 116 scales a nominal power to MeNB 102 or a nominal power to SeNB 103 in order to reduce a total transmission power, such as $w_{MeNB}\cdot\hat{P}_{MeNB}(i)$ or $w_{SeNB}\cdot\hat{P}_{SeNB}(i)$ in FIG. 12 or FIG. 14, a resulting transmission power is smaller than $\hat{P}_{CMIN\_MeNB}(i)$ or $\hat{P}_{CMIN\_SeNB}(i)$, respectively, a corresponding transmission is dropped and all available power is allocated as available power to the other transmission. Although proper settings for values of $\hat{P}_{CMIN\_MeNB}(i)$ and $\hat{P}_{CMIN\_SeNB}(i)$ should not result to a possibility that both a reduced transmission power to MeNB 102 and a reduced transmission power to SeNB 103 are lower than $\hat{P}_{CMIN\_MeNB}(i)$ or $\hat{P}_{CMIN\_SeNB}(i)$, respectively, if this event occurs, a transmission to SeNB 103 can be dropped. Alternatively, based on a relative prioritization of information contents for each transmission, UE 116 can determine whether to drop a transmission to MeNB 102 or to SeNB 103.

PHR for Operation with Dual Connectivity

To facilitate avoidance of exceeding a maximum power $\hat{P}_{CMAX}(i)$ in SF i by UE 116 for transmissions to MeNB 102 and to SeNB 103, for operation with dual connectivity UE 116 can report a new PHR type for a first eNB, such as MeNB 102 or SeNB 103, to a second eNB, such as SeNB 103 or MeNB 102, respectively. As the second eNB may not know transmissions, such as PUSCH transmissions, if any, from UE 116 to the first eNB in SF i then, unlike a conventional PHR type, the new PHR type for the first eNB is defined assuming that UE 116 does not transmit PUSCH in SF i in any serving cell c of the first eNB regardless of whether or not UE 116 actually transmits PUSCH in SF i. Moreover, unlike a conventional PHR type that is per cell of an eNB, the new PHR type is a combined PHR for all serving cells of an eNB and can be defined as $$PH_{new,eNB}(i) = \sum_c PH_{type1,c}(i)$$

where c is an index ranging over all serving cells of an eNB and $PH_{type1,c}(i)$ is defined in Equation 1.

Alternatively, in order to avoid communicating values of $\tilde{P}_{CMAX,c}(i)$ among eNBs, the new PHR type can be defined based on Equation 1 as $$PH_{new,eNB}(i) =$$
$$P_{CMAX,eNB}(i) - \sum_c \{P_{O\_PUSCH,c}(1) + \alpha_c(1)\cdot PL_c + f_c(i)\} \text{ (or}$$
$$PH_{new,eNB}(i) = P_{CMIN,eNB}(i) - \sum_c \{P_{O\_PUSCH,c}(1) + \alpha_c(1)\cdot PL_c + f_c(i)\}).$$

Otherwise, if $$PH_{new,eNB}(i) = \tilde{P}_{CMAX}(i) - \sum_c \{P_{O\_PUSCH,c}(1) + \alpha_c(1)\cdot PL_c + f_c(i)\},$$

UE 116 can also report $\tilde{P}_{CMAX}(i)$ for the eNB in addition to the PHR for the eNB. A new MAC control element can be defined for UE 116 to provide the new PHR type. Unlike a conventional PHR type, triggering for the new PHR type can be based not only on a path-loss change but also on a change of how often UE 116 has PUSCH transmissions in a respective eNB. For example, if a number of PUSCH transmissions in a frame from UE 116 to a first eNB increases by a predetermined factor, UE 116 can trigger a PHR transmission to a second eNB.

UE 116 can also provide a Buffer Status Report (BSR) for data transmissions to a first eNB or to a second eNB. The BSR can serve for the second eNB to predict PUSCH scheduling for UE 116 at the first eNB and therefore, possibly in conjunction with a new PHR, predict a total transmission power range for UE 116 to the first eNB. A new MAC control element can be defined for UE 116 to provide the new BSR type for a first eNB, such as SeNB 103, to a second eNB such as MeNB 102. The new BSR type can be a combined BSR for all serving cells of a respective first eNB or can be a vector containing a BSR for each of the serving cells of a respective first eNB in order to provide more detailed information to a second eNB regarding potential power limitations a UE can have per cell of the first eNB.

Although the present disclosure has been described with example embodiments, various changes and modifications may be suggested to one skilled in the art. It is intended that the present disclosure encompass such changes and modifications that fall within the scope of the appended claims.

What is claimed is:

1. A method comprising:
   receiving:
   a configuration of a first maximum power for transmissions on a first group of cells,
   a configuration of a second maximum power for transmissions on a second group of cells, and
   a configuration of a communication direction for time units in the first group of cells;
   determining a maximum power for transmissions on the second group of cells over a second time period, wherein the maximum power is:
   the second maximum power when the second time period overlaps with a time unit having a communication direction enabling transmission to the first group of cells, and
   a third maximum power, that is larger than the second maximum power, when the second time period does not overlap with any time unit having a communication direction enabling transmission to the first group of cells; and
   transmitting on the second group of cells with a second power that is not larger than the maximum power.

2. The method of claim 1, wherein the third maximum power is a maximum output power $P_{CMAX}$.

3. The method of claim 1, further comprising:
   determining a power for transmissions on the first group of cells independently from a power for transmissions on the second group of cells.

4. The method of claim 3, further comprising:
   determining a power headroom report for the first group of cells or for the second group of cells by assuming no transmission on the second group of cells or on the first group of cells, respectively.

5. The method of claim 1, wherein the first group of cells is associated with a master base station and the second group of cells is associated with a secondary base station.

6. The method of claim 5, further comprising:
   determining a first power for transmissions on the first group of cells over a first time period that overlaps with the second time period, wherein:
   the first power is not larger than the first maximum power,
   a sum of linear values for the first maximum power and the second maximum power is larger than a linear value of a maximum power for simultaneous transmissions on the first group of cells and on the second group of cells, and
   a sum of the linear values for the first power and the second power is larger than the linear value of the maximum power for simultaneous transmissions on the first group of cells and on the second group of cells,
   reducing the first power so that the sum of the linear values for the first power and the second power is not larger than the linear value of the maximum power for simultaneous transmissions on the first group of cells and on the second group of cells; and
   transmitting on the first group of cells with the reduced first power.

7. The method of claim 6, further comprising:
   transmitting on the second group of cells with the second power.

8. The method of claim 6, wherein the second time period overlaps with two first time periods.

9. A User Equipment (UE) comprising:
   a receiver configured to receive:
   a configuration of a first maximum power for transmissions on a first group of cells,
   a configuration of a second maximum power for transmissions on a second group of cells, and
   a configuration of a communication direction for time units in the first group of cells;
   a processor configured to determine a maximum power for transmissions on the second group of cells over a second time period, wherein the maximum power is:
   the second maximum power when the second time period overlaps with a time unit having a communication direction enabling transmission to the first group of cells, and
   a third maximum power, that is larger than the second maximum power, when the second time period does not overlap with any time unit having a communication direction enabling transmission to the first group of cells; and
   a transmitter configured to transmit on the second group of cells with a power that is not larger than the maximum power.

10. The UE of claim 9, wherein the third maximum power is a maximum output power $P_{CMAX}$.

11. The UE of claim 9, wherein the processor is further configured to determine a power for transmissions on the first group of cells independently from a power for transmissions on the second group of cells.

12. The UE of claim 9, wherein the processor is further configured to determine a power headroom report for the first group of cells or for the second group of cells by assuming no transmission on the second group of cells or on the first group of cells, respectively.

13. The UE of claim 9, wherein the first group of cells is associated with a master base station and the second group of cells is associated with a secondary base station.

14. The UE of claim 13, wherein:
   the processor is further configured to:
   determine a first power for transmissions on the first group of cells over a first time period that overlaps with the second time period, wherein:
   the first power is not larger than the first maximum power, a sum of linear values for the first maximum power and the second maximum power is larger than a linear value of a maximum power for simultaneous transmissions on the first group of cells and on the second group of cells, and a sum of the linear values for the first power and the second power is larger than the linear value of the maximum power for simultaneous transmissions on the first group of cells and on the second group of cells; and reduce the first power so that the sum of the linear values for the first power and the second power is not larger than the linear value of the maximum power for simultaneous transmissions on the first group of cells and on the second group of cells; and the transmitter is further configured to transmit on the first group of cells with the reduced first power.

15. The UE of claim 14, wherein the transmitter is configured to transmit on the second group of cells with the second power.

16. The UE of claim 14, wherein the second time period overlaps with two first time periods.

17. A pair of base stations comprising:
a first base station including:
a transmitter configured to transmit:
a configuration of a first maximum power for transmissions on a first group of cells,
a configuration of a second maximum power for transmissions on a second group of cells,
a configuration of a communication direction for time units in the first group of cells, and
signals on the first group of cells; and
a receiver configured to receive signals on the first group of cells; and a second base station including:
a transmitter configured to transmit signals on the second group of cells; and
a receiver configured to receive, on the second group of cells over a second time period, signals that are transmitted from a same transmitter with a power that is not larger than a maximum power, wherein the maximum power is:
the second maximum power when the second time period overlaps with a time unit having a communication direction enabling transmission to the first group of cells, and
a third maximum power, larger than the second maximum power, when the second time period does not overlap with any time unit having a communication direction enabling transmission to the first group of cells.

18. The pair of base stations of claim 17, wherein the receiver of the first base station or of the second base station is further configured to receive a buffer status report that includes a buffer status report for transmissions on the first group of cells and a buffer status report for transmissions on the second group of cells.

19. The pair of base stations of claim 17, wherein the receiver of the second base station is further configured to receive the configuration of the communication direction for time units in the first group of cells.

20. The pair of base stations of claim 17, wherein the receiver of the second base station is further configured to receive the configuration of the second maximum transmission power.

* * * * *